(12) United States Patent
Bhatnager et al.

(10) Patent No.: US 12,346,850 B1
(45) Date of Patent: Jul. 1, 2025

(54) SYSTEMS AND METHODS FOR DETERMINING FLEET CAPACITY

(71) Applicant: Zoox, Inc., Foster City, CA (US)

(72) Inventors: Rishi Bhatnager, Warren, NJ (US); Deepan Subrahmanian Palguna, Santa Clara, CA (US); Paul Syta, San Francisco, CA (US); Andrew Glen Tsao, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 260 days.

(21) Appl. No.: 18/056,910

(22) Filed: Nov. 18, 2022

(51) Int. Cl.
*G06Q 10/0631* (2023.01)
(52) U.S. Cl.
CPC .............................. *G06Q 10/06311* (2013.01)
(58) Field of Classification Search
CPC ......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 9,998,408 B2 * | 6/2018 | Malik | ................... | H04L 65/403 |
| 10,839,695 B2 * | 11/2020 | Kuncl | .................... | G06Q 50/40 |
| 2011/0130915 A1 * | 6/2011 | Wright | .................. | G01M 17/04 |
| | | | | 398/118 |
| 2015/0199697 A1 * | 7/2015 | Handley | ................ | G08G 1/205 |
| | | | | 705/7.31 |
| 2015/0220865 A1 * | 8/2015 | Acuna Agost | ... | G06Q 10/06312 |
| | | | | 705/7.22 |
| 2017/0068917 A1 * | 3/2017 | Rackley | ........... | G06Q 10/06313 |
| 2017/0193826 A1 * | 7/2017 | Marueli | ........... | G06Q 10/06311 |
| 2018/0259976 A1 * | 9/2018 | Williams | ............... | G05D 1/223 |
| 2019/0011931 A1 * | 1/2019 | Selvam | ................ | G05D 1/0088 |
| 2019/0025820 A1 * | 1/2019 | Ferguson | ............. | G08G 1/0112 |
| 2019/0086291 A1 * | 3/2019 | Frewen | .................. | G07C 5/006 |
| 2019/0196503 A1 * | 6/2019 | Abari | ..................... | G01C 21/34 |
| 2019/0385385 A1 * | 12/2019 | Davidson | ............ | G07C 5/0808 |

* cited by examiner

*Primary Examiner* — Alan S Miller
(74) *Attorney, Agent, or Firm* — Lee & Hayes, P.C.

(57) ABSTRACT

Systems and techniques for determining and predicting the operational capacity of a fleet of vehicles are described. Data may be collected for various fleet parameters (e.g., based on vehicle and fleet operations) and distributions of such data may be used to determine rates of change for the parameters. Predicted distributions of the fleet parameters may be determined based on historical parameter distributions and/or predicted distributions and the corresponding rates of change. Fleet operational capacity determinations may be made based on these parameter distributions, including probability distributions of predicted fleet operational capacity measurements.

20 Claims, 7 Drawing Sheets

SYSTEMS AND METHODS FOR DETERMINING FLEET CAPACITY

BACKGROUND

A transportation service provider may operate a fleet of vehicles that may be offered to customers to provide transportation for passengers and/or cargo. For example, a transportation service provider may operate a fleet of autonomous vehicles that can be used for passenger transportation based on user requests. A number of vehicles in such a fleet may be out of service at any particular time for various reasons, such as scheduled maintenance, repairs, component failures, lack of operators, etc. New vehicles may enter the fleet over time, while older vehicles may be removed from the fleet as they become unrepairable or obsolete. The quantity of available vehicles at a particular time period may affect the operational capacity of a fleet (e.g., passenger-miles per day, cargo-miles per week, etc.). Other variables affecting a fleet's operational capacity may include the number of available vehicle operators, regulatory requirements, changes in fleet operational systems, etc. Because there can be many variables affecting fleet operational capacity over time, and because such variables may independently change over time, determining accurate estimates and predictions of vehicle fleet operational capacity may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
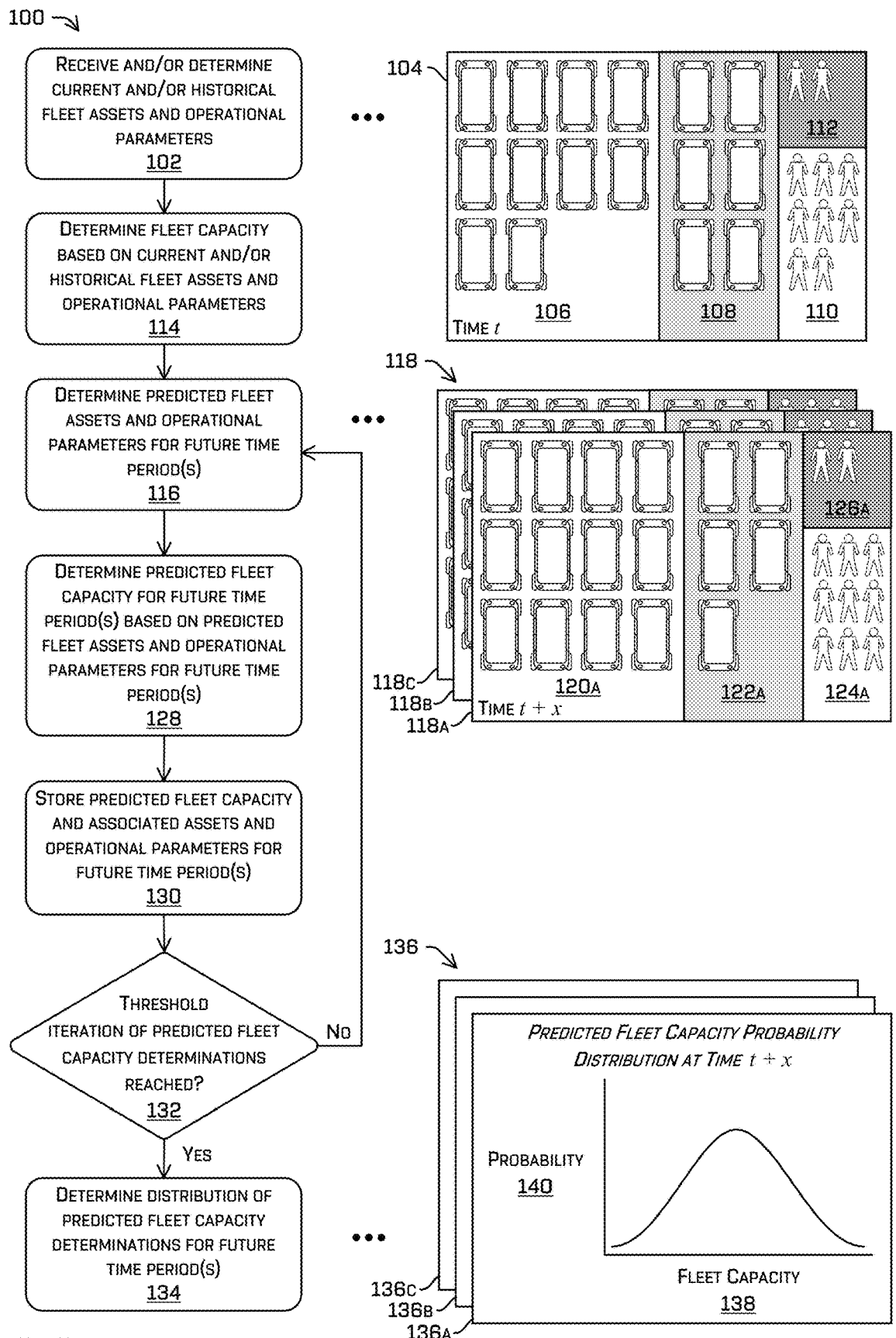
FIG. 1 illustrates an example process for determining a probability distribution of an operational capacity measurement for a fleet of vehicles, in accordance with examples of the disclosure.

A fleet of vehicles may include a number of vehicles that may be used for a variety of purposes. For example, a fleet operator may use a fleet of delivery or cargo vehicles to transport and/or deliver cargo (e.g., parcels, packages, mail, etc.). In another example, a fleet operator may operate a fleet of vehicles for providing passenger transport. Such fleets may include manually controlled vehicles driven by a driver situated within such vehicles. Other fleets may include autonomous vehicles that may be configured to autonomously operate without an on-board driver. Autonomous fleet vehicles may optionally (e.g., temporarily and/or as needed) be operated by a remote operator in communication with the vehicle. A fleet may include vehicles that provide cargo transport and vehicles that provide passenger transport, and some vehicles in such fleets may provide both forms of transport. A fleet may also, or instead, include vehicles that may be manually controlled by an on-board driver and autonomous vehicles, and some such vehicles in may be capable of both autonomous control and manual on-board control.

The operational capacity of a fleet of vehicles may represent the amount or level of transportation that such vehicles may be capable of providing at a particular time or period of time. Operational capacity may be measured in a variety of ways, including a total number of operational miles across the fleet for a time period, an average number of operational miles per vehicle for a time period, an average amount of autonomous operation time per vehicle in the fleet for a time period, a total amount of autonomous operation time across the fleet for a time period, etc. Many different variables may affect the (e.g., current or predicted) operational capacity of a fleet of vehicles. For example, one or more vehicles in a fleet may not be capable of service at a particular time for a variety of reasons (e.g., scheduled maintenance, repairs, damage, etc.). One or more vehicles in a fleet may also, or instead, not be available for service at a particular time for a variety of reasons unrelated to vehicle capabilities (e.g., lack of fuel, regulatory restrictions, etc.). For vehicles in a fleet that require an operator (e.g., an on-board driver or an available remote operator), a lack of available operators may cause one or more such vehicles to be unavailable for service. In other examples, where fleet operational capacity may be measured, at least in part, as autonomously driven miles and/or time, the miles and/or time driven under control of a remote operator or on-board driver may be excluded in an associated operational capacity measurement of time and/or mile operated autonomously.

Vehicles entering and/or exiting a fleet may also impact the measurement of fleet capacity. For example, over time, one or more vehicles (e.g., new vehicles) may be added to a fleet, increasing the potential fleet operational capacity. Similarly, one or more vehicles (e.g., obsolete, aged-out, unrepairable vehicles) may be removed from a fleet over time, reducing the potential fleet operational capacity. Other factors may further impact the operational capacity of a fleet of vehicles and/or the measurement thereof.

The disclosed systems and techniques may also be used to determine, measure, and/or predict one or more conditions of a fleet and/or any other attribute of one or more vehicles that may be in a fleet of vehicles. For example, the disclosed system and techniques may be used to determine and/or predict vehicle maintenance intervals and/or costs, vehicle wear, vehicle and/or component obsolescence, future vehicle requirements for a fleet, etc.

Due to the many factors that may impact the various types of fleet operational capacity and/or condition determinations, it may be challenging to determine a current fleet operational capacity and/or a fleet capacity for a time or time period in the past. These factors may also complicate the prediction of future fleet operational capacity, especially when such predictions may be based on current operational capacity data. The various techniques described herein may be used to determine current and/or predicted fleet operational capacity data and/or predicted fleet operational capacity data and probability distributions. These techniques may improve the accuracy of fleet data (e.g., current and predicted) and therefore improve the efficiency of operating a fleet. With the improved data facilitated by the disclosed systems and techniques, fleet operators and fleet operations systems may better manage vehicle operations, maintenance, and operator staffing, thereby better maintaining and potentially improving the condition of the vehicles in the fleet. Vehicles that are well maintained, operated appropriately, and in good condition may provide improved passenger comfort and safety. Systems and techniques for determining current and predicted fleet operational capacity data and/or associated probabilities and probability distributions based on various criteria are discussed herein.

In various examples, a fleet capacity determination system may be configured to determine a probability distribution of fleet capacity for a particular time based on one or more vehicle operational parameters (also referred to as "fleet parameters"). A fleet parameter or vehicle operational parameter may be any data associated with the operation of one or more vehicles in a fleet and/or otherwise representing a parameter that may affect fleet operations in some way. The fleet parameters used to determine such a probability distribution may be determinable fleet parameters (e.g., based on available current and/or historical fleet operational data) and/or predicted fleet parameters. In various examples, computing system configured in at individual vehicles in a fleet may be configured to determine vehicle parameter data, such as time and/or miles driven, time and/or miles drive autonomously, time and/or miles controlled by an operator (e.g., a remote operator), and/or other vehicle condition and/or operational data. Such vehicle computing systems may be configured to transmit or otherwise provide such data to a fleet management system that may include or interact with the fleet capacity determination system. For example, vehicles in a fleet may include one or more components configured to determine and transmit such data to a fleet data store that may be accessed by a fleet capacity determination system for performing operations such as those described herein.

In examples, the fleet capacity determination system may determine probability distributions for one or more fleet parameters that it may then use to determine a probability distribution of fleet operational capacity by sampling the probability distributions of the one or more fleet parameters. The system may determine a rate of change for one or more of the fleet parameters over time (e.g., based on historical data) that it may use to determine a predicted probability distribution for the respective one or more fleet parameters. The system may use probability distributions of the one or more fleet parameters and/or of fleet operational capacity associated with a particular time to determine probability distributions for the one or more fleet parameters and/or of fleet capacity for a subsequent (e.g., future) time. In examples, the fleet capacity determination system may determine predicted probability distributions of the one or more fleet parameters and/or of fleet operational capacity at a first future time to determine subsequent predicted probability distributions of the one or more fleet parameters and/or of fleet capacity at a second future time subsequent to the first future time.

In various examples, one or more parameters may be used to determine a value for a measurement of an operational capacity of a fleet. As described herein, measurements of fleet operational capacity may take various forms and be associated with various time periods. For example, fleet capacity may be measured as units of time or distance per time period and/or per vehicle, such as a total number of miles driven by all vehicles in a fleet for a period of time, an average number of miles of operation per vehicle for a period of time, a total number of hours of operation by all vehicles in a fleet for a period of time, an average number of hours of operation per vehicle for a period of time, a total number of miles of autonomous operation by all vehicles in a fleet for a period of time, an average number of miles of autonomous operation per vehicle for a period of time, a total number of hours of autonomous operation by all vehicles in a fleet for a period of time, an average number of hours of autonomous operation per vehicle for a period of time, etc. There may be one or more parameters that may vary over time that may affect such measurements.

For example, a number of vehicles in a fleet may vary over time as vehicles are introduced to the fleet and/or removed from the fleet for various reasons (e.g., new vehicle acquisition, vehicle retirements, vehicle obsolesces, permanent vehicle disablement (e.g., due to a crash or catastrophic malfunction), etc.). From among the number of vehicles associated within a fleet, a subset of such vehicles May not be available for normal usage or operation at a particular time for various reasons (e.g., undergoing maintenance, awaiting replacement parts, etc.). The total number of vehicles in the fleet, the subset of vehicles that are not operable, and the subset of vehicles in the fleet that are available for operation at a particular time period may be parameters that may vary over time and affect one or more fleet capacity measurements.

In some fleets and/or for some types of fleet vehicles, one or more operators may be required for vehicles operation or required to be available to operating vehicles. For example, one or more drivers may be required to drive a manually operated vehicle in a fleet. Alternatively, one or more remote operator may be required to be available to operate an autonomous vehicle in a fleet when needed. The number of operators may also vary over time as operators are added or removed from the population of operators associated with the fleet (e.g., as operators quit, are fired, are hired, etc.). From among the population of operators associated with a fleet, a subset of such operators may not be available at a particular time to assist in normal operations for various reasons (e.g., out sick, on vacation, off shift, etc.). The total number of operators associated with a fleet, the subset of operators associated with the fleet that are not available to assist in vehicle operation, and the subset of operators associated with the fleet that are available to assist in vehicle operation at a particular time period may also, or instead, be parameters that may vary over time and affect one or more fleet capacity measurements.

The manner of operation of the vehicles in a fleet may also, or instead, be a parameter that may vary over time and affect a fleet capacity measurement. For example, a fleet capacity measurement may be based on one or more fleet parameters associated with a distance of autonomous operation and/or an amount of time of autonomous operation for a particular time period (e.g., for individual vehicles and/or across the fleet). A fleet capacity measurement may also, or instead, be based on one or more fleet parameters associated with a distance of manual operation and/or an amount of time of manual operation for a particular time period (e.g., for individual vehicles and/or across the fleet).

Deterministic predictions of fleet operational capacity measurements may be based on historical parameter data, but such predictions may be inaccurate due to the (e.g., constantly and/or individually) changing attributes of a fleet over time, as may be reflected in the variable values of fleet parameters over time. In various examples, rather than determining particular predicted fleet operational capacity measurements that are likely to be inaccurate, the disclosed fleet capacity determination system may use historical parameter data to determine historical distributions of fleet parameters and/or rates of change of such parameters to determine predicted distributions of fleet operational capacity measurements. In doing so, a fleet capacity determination system may determine predicted distributions of particular fleet parameters upon which predicted distributions of fleet operational capacity measurements may be based. The disclosed systems and techniques may also determine subsequent distributions of predicted fleet operational capacity measurements and/or distributions of predicted fleet parameters based on other distributions of predicted fleet operational capacity measurements and/or distributions of predicted fleet parameters determined for previous time periods. For example, a fleet capacity determination system may use a predicted fleet operational capacity measurement and/or parameter for a first future time period to determine a predicted fleet operational capacity measurement and/or parameter for a second future time period subsequent to the first future time period.

In various examples, historical data associated with one or more parameters may be used to determine one or more probability distributions for the respective one or more parameters. For example, fleet parameter data may be available for a fleet representing daily values for a number of vehicles, a number of operational vehicles, a number of operators, a number of available operators, a total number of miles driven, a number of miles driven autonomously, etc. The fleet capacity determination system may determine a distribution of such data for one or more fleet parameters for individual months of a previous year based on the available daily parameter data.

Using such historical data distributions, the fleet capacity determination system may determine, for individual parameters, a rate of change for the parameter (e.g., a rate of change of fleet parameter values and/or vehicle operational parameter values over time). For example, the average number of vehicles and/or the average number of operational vehicles in the fleet (e.g., the highest probability value of the associated distribution) may have increased an average of 5% month-to-month over the past year. In another example, the average number of operators and/or the average number of available operators (e.g., the highest probability value of the associated distribution) may have decreased an average of 2% month-to-month over the past year.

Using one or more determined rates of change, the fleet capacity determination system may determine a probability distribution for one or more parameters from which to sample in determining a predicted probability distribution for such parameters. For example, the fleet capacity determination system may determine a most recent distribution of values for a particular parameter (e.g., a distribution of the most recent month's data for that parameter) or an aggregated distribution of values for that parameter (e.g., an aggregated distribution of a year's data for that parameter) as an initial distribution that may serve as a basis for determining a predicted distribution for that parameter. The fleet capacity determination system may adjust this initial distribution based on a determined rate of change for that parameter to determine the predicted distribution for the parameter. For example, if the particular parameter has been determined to increase on average by 5% a month, the fleet capacity determination system may adjust the mean value of the initial distribution by 5% and perform corresponding adjustments to the remaining values of the initial distribution to determine the predicted distribution for that parameter for a month in the future. The fleet capacity determination system may perform this predicted distribution determination operation for the one or more parameters that may be used to determine a predicted fleet operational capacity measurement.

In various examples, a determined rate of change may be time-based and/or based on one or more other criteria. For example, the rate of change of a fleet parameter may be an increase or decrease of a particular (e.g., constant) number of units associated with the parameters (e.g., vehicles in the fleet, operation vehicles, number of operators associated with the fleet, available operators, etc.) rather than, or in combination with, a percentage increase or decrease of such units. In examples, the rate of change of a fleet parameter may be based on a time of year or other time period (e.g., season). For instance, the rate of change may be a 5% increase and/or 5 unit increase per month for November through March and an 8% increase and/or 8 unit increase per month for April through October. In another example, the rate of change may alternate between a first rate of change and a second rate of change every other month. Various alternative and additional rates of changes may be determined in using the techniques described herein.

The fleet capacity determination system may then sample the predicted distributions for the individual parameters to determine values that may then be used to determine a predicted fleet operational capacity measurement. For example, to predict a fleet operational capacity measurement for a month in the future, the fleet capacity determination system may sample values from predicted distributions for a month in the future associated with individual fleet parameters to determine a particular fleet operational capacity measurement. In a particular example, the fleet capacity determination system may determine predicted distributions for a number of operational vehicles, a number of available operators, and a number of miles driven autonomously for in the future based on historical fleet data. The fleet capacity determination system may sample a value from these individual predicted distributions to determine a number of miles to be driven autonomously per vehicle per day for a month in the future.

The fleet capacity determination system may perform multiple fleet operational capacity measurement determinations (e.g., iteratively, in parallel, using a Monte Carlo simulation and/or techniques, etc.) using parameter sampling as described above to determine a probability distribution for the fleet operational capacity measurement. For example, the fleet capacity determination system may repeatedly sample the predicted distributions for the individual parameters a threshold number of times (e.g., 50, 1000, 50,000, etc.) to determine a corresponding number of a particular fleet operational capacity measurements. The resulting fleet operational capacity measurements may be used to determine a probability distribution for that measurement representing the probability of values of that measurement at a point in the future. Continuing the example above, the fleet capacity determination system may sample values from the individual predicted distributions for the number of operational vehicles, the number of available operators, and the number of miles driven autonomously 50,000 times to perform 50,000 determinations of a predicted number of miles driven autonomously per vehicle per day for a month in the future that may be used to determine a probability distribution of the values for the predicted number of miles driven autonomously per vehicle per day for a month in the future.

The fleet capacity determination system may use predicted distributions of fleet parameters and/or predicted fleet operational capacity measurements to determine further predicted distributions of predicted distributions of fleet parameters and/or predicted fleet operational capacity measurements. For example, using one or more predicted distributions for the individual fleet parameters and, in some examples, a determined rate of change for such parameter(s), the fleet capacity determination system determine one or more subsequent predicted distributions for the individual fleet parameters for a time period subsequent to that associated with the predicted distributions. The fleet capacity determination system may then sample these subsequent predicted distributions for the individual fleet parameters to determine subsequent predicted fleet operational capacity measurements for the subsequent time period and a corresponding probability distribution for the predicted fleet operational capacity measurement.

The data associated with the values of the probability distributions for fleet operational capacity measurements may be stored along with the predicted fleet operational capacity measurements for performing operations related to fleet and vehicle management and maintenance. For example, the sampled fleet parameter values used to determine individual operational capacity measurements in a probability distribution for the operational capacity measurement may be stored with the distribution for fleet operational analysis. In various examples, such values may be used to determine particular parameter effects on a fleet operational measurement. For instance, correlations between outlier values in a probability distribution for an operational capacity measurement and one or more particular parameters may be determined to identify parameters that may or may not have a substantial impact on the operational capacity measurement. In a simple example, extremely low and extremely high values of a particular operational capacity measurement may be correlated with very low and very high values, respectively, of a fleet parameter associated with a number of available vehicles, while a fleet parameter associated with a number of available operators per vehicle may be relatively consistent across all values, including the extremely low and extremely high values of a particular operational capacity measurement, in the probability distribution for the particular operational capacity measurement.

Based on such data correlations determined by a fleet capacity determination system, a fleet management system may determine that the effect of the number of available vehicles on the fleet capacity is significant while the effect of the number of available operators per vehicle is minimal. The fleet management system may responsively and, in some examples, automatically, take one or more actions to ensure a threshold number of vehicles are available. For instance, the fleet management system may automatically order a number of vehicles (e.g., from a reserve pool of vehicles, from a vehicle manufacturer system, from a vehicle leasing system, etc.) to replenish the fleet should the number of available vehicle fall below a threshold number.

Such data correlations may also be used by a fleet management system to perform proactive fleet management operations. For example, using data correlations determined from probability distributions for predicted fleet operational capacity measurements determined by a fleet capacity determination system, a fleet management system may determine that the effect of a predicted number of available vehicles on the fleet capacity is significant while the effect of the predicted number of available operators per vehicle is minimal. The fleet management system may responsively and, in some examples, automatically, take one or more actions to proactively increase the number of vehicles that will be available in the time period associated with the predicted fleet operational capacity measurements. For instance, the fleet management system may automatically order or recommend ordering an increased number of vehicles such that the increased number of vehicles are available to the fleet at the future time period.

In examples, a fleet management system may determine a manner of assigning vehicles based on vehicle capabilities and the distributions of fleet parameters and fleet capacity measurements described herein. For example, a fleet management system may integrate into a fleet vehicles that have a subset of capabilities to compensate for a shortfall of fully capable vehicles. For instance, a fleet may require 100 vehicles total in its fleet but may have only 80 vehicles available capable of operating at both highway speeds and urban street speeds. The fleet management system may integrate 20 vehicles that can only operate at urban street speeds (e.g., by design or due to damage, malfunction, etc.) into the fleet to bring the fleet up to 100 available vehicles. The fleet management system may then assign those limited capability vehicles to provide only urban service. Other vehicle characteristics and capabilities may be evaluated and used by a fleet management system to systematically manage a fleet based on vehicle capabilities and the distributions of fleet parameters and fleet capacity measurements described herein.

In various examples, a fleet management system and/or a fleet capacity determination system may proactively and/or automatically control vehicles in a fleet based on distributions of predicted fleet operational capacity measurements and/or distributions of predicted fleet parameters. For example, a fleet capacity determination system may determine a target operational capacity measurement or range of operational capacity measurements for a fleet for a future period of time. The fleet capacity determination system may determine a distribution of predicted fleet operational capacity measurements for that time period and compare that distribution to the target measurement or range of measurements. If the target measurement(s) are in a relatively low probability portion of the probability distribution of predicted measurements, the fleet capacity determination system may determine one or more fleet parameters that may be adjusted to determine a probability distribution of predicted fleet operational capacity measurements for that time period that includes the target measurement(s) in a relatively higher probability portion of the distribution.

This parameter adjustment technique may be iteratively performed until a satisfactory probability distribution of predicted fleet operational capacity measurements is determined and/or may be performed based on other information. For example, the fleet capacity determination system may determine (e.g., based on outlier analysis as described herein) that increasing the number of operational vehicles at a particular location may be the most effective way to impact a fleet particular measurement for the location based on determining the parameters associated with outliers of one or more distributions of predicted fleet operational capacity measurements for that location. The fleet capacity determination system may, e.g., iteratively or in parallel) increase the number of operational vehicles and determine corresponding distributions of predicted fleet operational capacity measurements. Based on determining a probability distribution of predicted fleet operational capacity measurements that includes the target measurement(s) in a sufficiently higher probability portion of the distribution (e.g., within particular bounds, above a threshold probability, etc.), the fleet capacity determination system use the fleet parameter of the number of operational vehicles associated with the higher probability measurements for controlling the fleet. For example, the fleet capacity determination system may control one or more vehicles to move to the location so that the number of operational vehicles at that location corresponds to the number of operational vehicles associated with the higher probability measurements in the probability distribution of predicted fleet operational capacity measurements for that location that includes the target measurement(s) in a sufficiently high probability.

In various examples, parameter data may be used to determine one or more probability distributions for a fleet operational capacity measurement for the fleet as a whole and/or for one or more subsets of the fleet. For example, parameter data associated with a particular location and/or vehicles associated with the particular location may be used to determine predicted parameter distributions that may then be used to determine fleet operational capacity measurement probability distributions for that location. Alternatively or additionally, parameter data associated with a particular type of vehicle may be used to determine predicted parameter distributions that may then be used to determine fleet operational capacity measurement probability distributions for that type of vehicle. In another example, parameter data associated with a particular age or age range of vehicle (e.g., vehicles that are 0-3 years old, vehicles older than 5 years, etc.) may be used to determine predicted parameter distributions that may then be used to determine fleet operational capacity measurement probability distributions for that age of vehicle. Any other subsets of a fleet may be defined based on any one or more other attributes, conditions, or characteristics of a vehicle and may be used to determine fleet operational capacity measurement probability distributions for such subsets of a fleet.

The fleet operational capacity measurement probability distributions and/or the underlying predicted parameter distributions determined as described herein may be validated based on results from an operational environment. For example, a distribution of (e.g., daily) values for a particular fleet operational capacity measurement at the end of a particular month may be compared to the predicted probability distribution for that fleet operational capacity measurement previously determined for that month. If the two fleet operational capacity measurement distributions vary (e.g., significantly) from one another (e.g., the means of the distributions vary significantly), the model and/or operations used for determining the predicted probability distribution for that fleet operational capacity measurement may be modified to improve its predictive capabilities. In another example, the values or distribution of a fleet parameter may be compared to a predicted distribution for that parameter to determine whether the actual values or distribution varies significantly from the predicted results for that parameter. If so, the model and/or operations used for determining the predicted distribution for that parameter may be modified to improve its predictive capabilities (e.g., by adjusting the rate of changes used to determine the predicted distribution based on historical data or previously predicted data).

The systems and techniques described herein may be directed to leveraging vehicle and fleet parameters and other operational data to enable a fleet determination system associated with a fleet of vehicles, such as autonomous vehicles, to more accurately determine and predict fleet operational capacity measurements and fleet conditions, safety, and performance data so that vehicles in the fleet may be more efficiently and safely controlled. By having more accurate current and predicted fleet and vehicle data, a fleet may be efficiently managed and maintained, thereby increasing the safety and efficiency of the vehicles in the fleet. This in turn may improve the comfort and safety of passengers that may be traveling in vehicles in the fleet. In particular examples, the systems and techniques described herein can utilize data structures containing data representing various vehicle and/or fleet conditions, operational, and/or performance parameters, current and/or predicted distributions of such values, and/or any other fleet or vehicle data and/or associated data. By using the fleet operational capacity determination techniques described herein to more accurately determine predicted probability distributions for fleet operational capacity measurements, the examples described herein may result in increased safety for passengers of vehicles and for those outside the vehicles (e.g., pedestrians) in such a fleet by increasing the availability of safe and fully operational vehicles where needed. The examples described herein may also increase the efficiency of fleet management and reduce the costs of fleet maintenance due to improved fleet management and planning. For fleets that include autonomous vehicles, these improved predictive techniques may allow such autonomous vehicles to more safely operate in an environment. For example, the techniques described herein may be faster and/or more robust than conventional techniques, as they may provide for the ability of a fleet management system to automatically and proactively identify and address future issues that may impact the health and condition of vehicles in a fleet, thereby ensuring improved and safer operation of the vehicles in the fleet. That is, techniques described herein provide a technological improvement over existing fleet and vehicle capacity and condition prediction technology.

The techniques described herein may also improve the operation of computing systems and increase resource utilization efficiency. For example, computing systems, such as vehicle computing systems and fleet management computing systems, may more efficiently perform fleet capacity measurement determinations using the techniques described herein because the disclosed examples may reduce the amount of data needed to determine such measurements by reducing or eliminating the need to acquire updated data and manually perform (deterministic and potentially inaccurate) predictions of fleet operational capacity determinations. The disclosed examples may also reduce the amount of data needed to represent various fleet conditions and reduce the amount of processing required to determine such conditions by aggregating data representing such fleet conditions into data associated with a predicted fleet operational capacity measurement probability distribution. Furthermore, computing systems, such as vehicle computing systems and fleet management computing systems, may more efficiently perform various predicted probability distribution determination operations and the calculations required to determine fleet measurement and/or condition correlations by maintaining parameter data with predicted probability distributions, thereby requiring less processing to determine a correlation between one or more parameters and a fleet condition than would be required using conventional techniques where a fleet measurement or condition and one or more such parameters may not be stored or otherwise associated with one another.

The systems and techniques described herein can be implemented in a number of ways. Example implementations are provided below with reference to the following figures. Although the disclosed techniques may be discussed in the context of an autonomous vehicle and/or fleets of autonomous vehicles, the techniques described herein can be applied to a variety of systems (e.g., semi-autonomous vehicles and/or fleets thereof, manually operated vehicles and/or fleets thereof, fleets of vehicles having sensor systems of any types, robotic platforms and/or fleets thereof, etc.) and are not limited to autonomous vehicles and autonomous vehicle fleets. In another example, the techniques can be utilized in an aviation or nautical context, or in any system involving fleets of vehicles of any type. Further, although aspects of the disclosed systems and techniques may be discussed in the context of fleet and/or vehicle data that may have originated with particular types of vehicles and/or fleets and processing with particular types of components, data and data structures as described herein can include any data associated with any types of vehicles and/or fleets processed using any types of components. Additionally, the systems and techniques described herein can be used with real data (e.g., captured using sensor(s)), simulated data (e.g., generated by a simulator, training data, and the like) or any combination of thereof.

Figure 6:
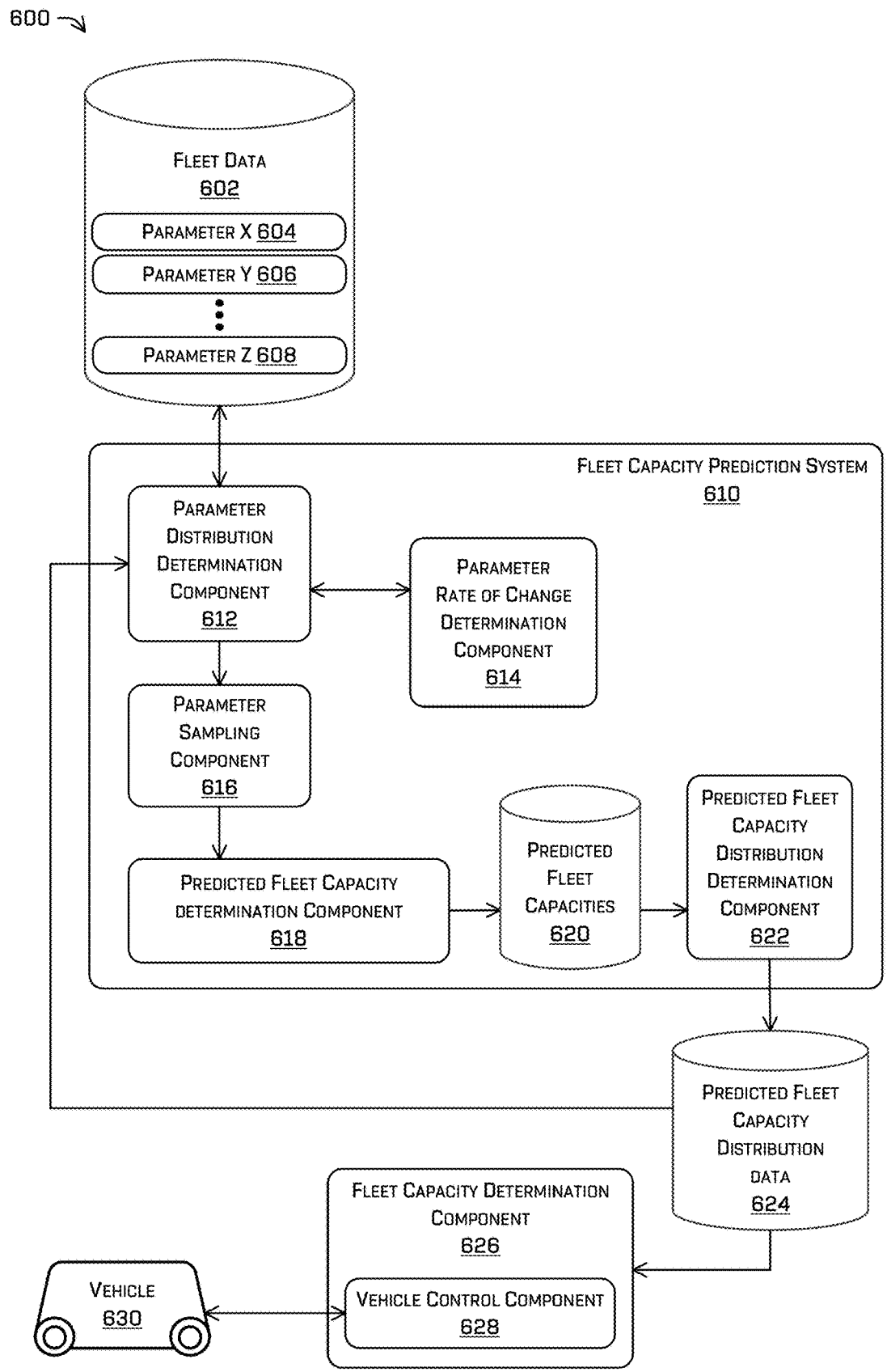
FIG. 6 depicts a block diagram representing an example system for determining probability distributions for operational capacities for a fleet of vehicles, in accordance with examples of the disclosure.
Figure 7:
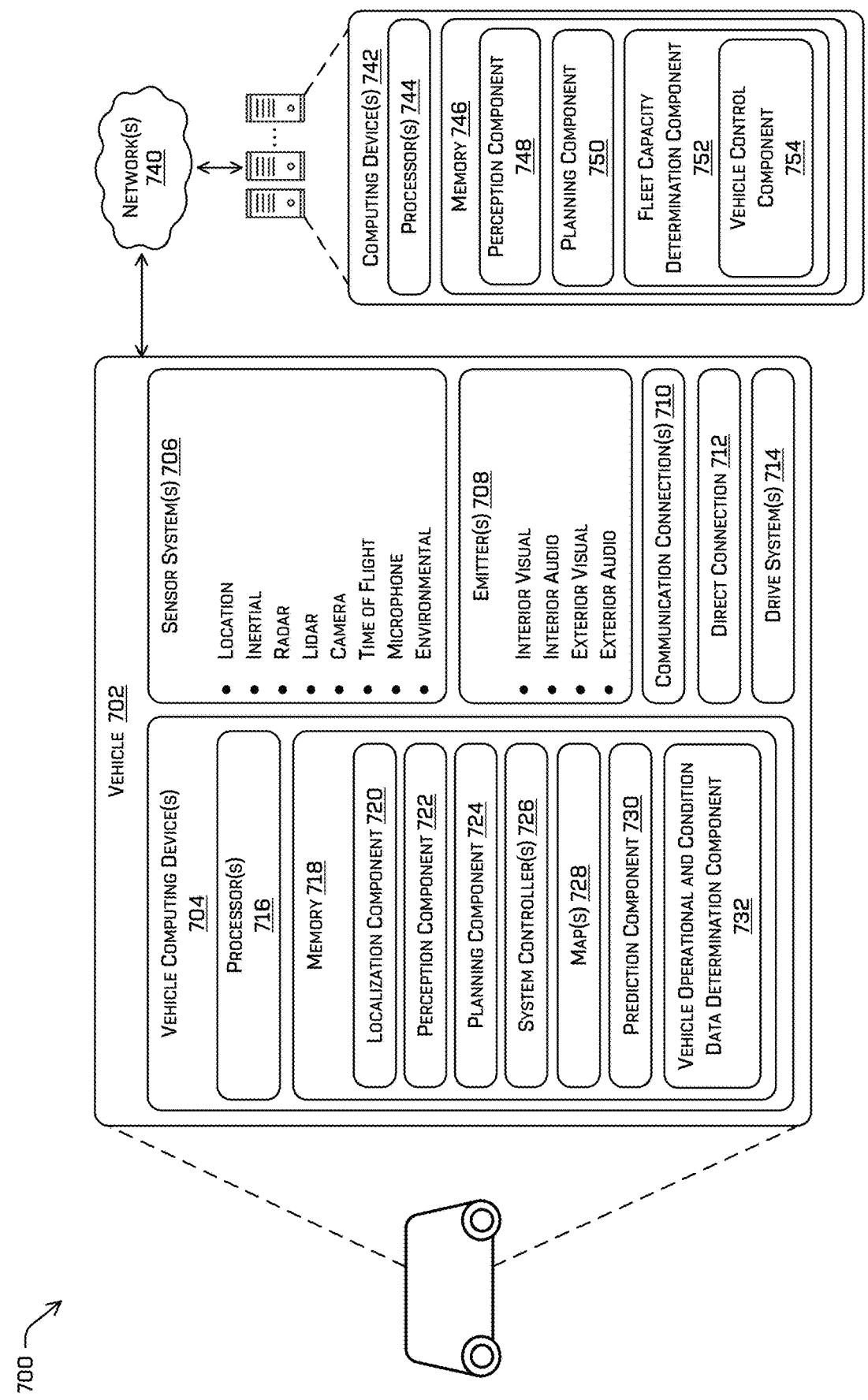
FIG. 7 depicts a block diagram of an example system for implementing the techniques described herein.

FIG. 1 is a pictorial flow diagram of an example process 100 for determining probability distributions for predicted fleet operational capacity measurements. In examples, one or more operations of the process 100 may be implemented by using a fleet capacity determination system and/or a vehicle computing system, such as by using one or more of the components and systems illustrated in FIGS. 6 and 7 and described below. For example, one or more components and systems can include those associated with the fleet capacity determination system 600 illustrated in FIG. 6 and/or the vehicle operational and condition data determination component 732, the fleet capacity determination component 752, processors 716 and/or 744, and/or memories 718 and/or 746 illustrated in FIG. 7. In examples, the one or more operations of the process 100 may be performed by a remote system in communication with a vehicle, such as computing device 742 (e.g., executing the fleet capacity determination component 752) illustrated in FIG. 7. In still other examples, the one or more operations of the process 100 may be performed by a combination of a remote system and a vehicle computing system. However, the process 100 is not limited to being performed by such components and systems, and the components and systems of FIGS. 6 and 7 are not limited to performing the process 100.

At operation 102, a fleet capacity determination system may receive and/or determine fleet assets and/or operations parameters (e.g., referred to collectively as "fleet parameters" or "vehicle operational parameters" herein). In various examples, individual vehicles in a fleet may transmit individual vehicle parameter data, such as time and/or miles driven, time and/or miles drive autonomously, time and/or miles controlled by an operator (e.g., a remote operator), and/or other vehicle condition and/or operational data to the fleet capacity determination system and/or to one or more other systems accessible by the capacity determination system. Other vehicle operational parameter data and/or values reflecting fleet parameters may also be accessed and/or determined by the fleet capacity determination system, such as a number of vehicles in the fleet, a number of operational vehicles in the fleet, a number of operators for the fleet, a number of available operators for the fleet, etc. Such data may be associated with a particular time or time period (e.g., a day, hour, week, etc.).

An example 104 illustrates example fleet parameters that that may be determined, for example, at operation 102. The fleet of example 104 may represent fleet parameters at a time t, where/may be a particular day, hour, week, etc. At time 1, the fleet may have a number of operational vehicles 106 and a number of inoperable vehicles 108 that may be unavailable for normal use (e.g., due to maintenance, damage, waiting on parts, etc.). The sum of the number of operational vehicles 106 and the number of inoperable vehicles 108 may represent the total number of vehicles in the fleet of example 104. At time t, the fleet may also have a number of available operators 110 and a number of unavailable operators 112 that may not be available at time t for performing vehicle operation functions (e.g., out sick, on vacation, off shift, etc.). The sum of the number of available operators 110 and the number of unavailable operators 112 may represent the total number of operators associated with the fleet of example 104.

At operation 114, the fleet capacity determination system may determine values for one or more fleet operational capacity measurements based on the fleet parameter data determined at operation 102. For example, for one or more time periods for which fleet parameter data was determined at operation 102, the fleet capacity determination system may determine a total number of miles and/or amount of time driven for the fleet (e.g., cumulative for all vehicles in the fleet), an average number of miles and/or amount of time driven per vehicle in the fleet, a total number of miles and/or amount of time driven autonomously for the fleet, an average number of miles and/or amount of time driven autonomously per vehicle in the fleet, a total number of miles and/or amount of time driven under the control of an operator (e.g., remote operator) for the fleet, an average number of miles and/or amount of time driven under the control of an operator per vehicle in the fleet, an average vehicle speed for the time period, a total amount of time parked while operating for the fleet, an average amount of time parked while operating per vehicle in the fleet, etc.

Examples of one or more fleet operational capacity measurements may also, or instead, include an average and/or total amount of time and/or distance driven per vehicle and/or for a fleet or subset of the fleet with passengers in the associated vehicles. In examples, an average and/or total amount of time and/or distance driven per vehicle and/or for a fleet or subset of the fleet for one or more particular purposes may be measured. For example, a fleet operational capacity measurement may capture an average and/or total amount of time and/or distance driven per vehicle and/or for a fleet or subset of the fleet for cargo delivery trips, mapping trips, testing trips, etc.

Further at operation 114, as described in more detail herein, the fleet capacity determination system may determine distributions of parameter data for particular time periods using the data determined at operation 102. For example, the fleet capacity determination system may determine a distribution of parameter data for a particular parameter for a particular month using daily parameter data for that month. The fleet capacity determination system may use multiple such distributions for a particular parameter for a set of temporally sequential time periods (e.g., a number of consecutive months) to determine a rate of change of that parameter over the sequential time periods.

In various examples, the measurements, parameters, distributions, and/or other data determined at operation 114 may be stored and used for validation purposes. For example, predicted fleet capacity measurements and/or associated distributions that were previously determined (e.g., as described in more detail herein) may be compared to current and/or historical fleet capacity measurements and/or associated distributions determined at operation 114 to determine whether and how the predicted measurement and/or probability distribution determination operations may be modified to improve the predictive capabilities of such operations.

At operation 116, the fleet capacity determination system may determine one or more predicted fleet parameters for one or more future time periods based on the current and/or historical parameters and/or distributions determined at operations 102 and/or 114. For example, the fleet capacity determination system may determine a predicted distribution for a particular fleet parameter by adjusting a current or most recent distribution for the fleet parameter based on a determined rate of change for the parameter that was determined using multiple historical distributions for the parameter (e.g., as described herein). This distribution determination operation may be performed using one or more modeling or distribution fitting techniques, which may be generalized techniques and/or may be modeling or fitting techniques specific to the parameter or type of parameter. Further at operation 116, the fleet capacity determination system may sample the predicted distribution for a particular fleet parameter to determine a parameter value that may then be used to determine fleet operational capacity measurements in subsequent operations. At operation 116, the fleet capacity determination system may perform such distribution determination and sampling operations for the individual fleet parameters that may be used for determining one or more fleet operational capacity measurements in subsequent operations.

An example 118 illustrates example predicted fleet parameters that may be determined, for example, at operation 116. The parameters of example 118 may be parameters determined by sampling the probability distributions associated with such parameters. In various examples, such probability distributions may be determined using historical parameter data and/or adjusted based on determined rates of changes for such parameters as described herein. The fleet parameters of example 118 may represent predicted fleet parameters at various future times or time periods, for example at time t+x for example predicted parameters 118$a$, where t may be a particular day, hour, week, etc. and x may be a period of time, such that time t+x represents a time or time period subsequent to time 1.

At future time t+x, as shown in this example, the fleet capacity determination system may predict that the fleet may have a number of operational vehicles 120$a$ that is greater than the number of operational vehicles 106 of example 104, and a number of inoperable vehicles 122$a$ that may be unavailable for normal use that is less than the number of inoperable vehicles 108 of example 104. The sum of the predicted number of operational vehicles 120$a$ and the predicted number of inoperable vehicles 122$a$ may represent the predicted total number of vehicles in the fleet of example 104.

At future time t+x, as shown in this example, the fleet capacity determination system may also determine a predicted number of available operators 124$a$ that is greater than the number of available operators 110 of example 104, and a predicted number of unavailable operators 126$a$ that may be predicted to not be available at future time t+x for performing vehicle operation functions that is less than the number of unavailable operators 112 of example 104. The sum of the predicted number of available operators 124$a$ and the predicted number of unavailable operators 126$a$ may represent the predicted total number of operators associated with the fleet of example 118.

Example predicted parameters 118$b$ and 118$c$ may represent other example predicted fleet parameters that may be determined at operation 116. For example, the predicted parameters 118$b$ and 118$c$ may represent parameter values sampled from adjusted probability distributions of fleet parameters. Alternatively or additionally, the example predicted parameters 118$b$ and 118$c$ may represent parameter values for different times (e.g., subsequent to time t+x).

At operation 128, the fleet capacity determination system may determine one or more predicted fleet capacity measurement for a future time or time period using the one or more predicted fleet parameter values determined at operation 116. For example, the fleet capacity determination system may determine a predicted total number of miles and/or amount of time driven for the fleet, a predicted average number of miles and/or amount of time driven per vehicle in the fleet, a predicted total number of miles and/or amount of time driven autonomously for the fleet, a predicted average number of miles and/or amount of time driven autonomously per vehicle in the fleet, a predicted total number of miles and/or amount of time driven under the control of an operator (e.g., remote operator) for the fleet, a predicted average number of miles and/or amount of time driven under the control of an operator per vehicle in the fleet, a predicted average vehicle speed for the time period, a predicted total amount of time parked while operating for the fleet, a predicted average amount of time parked while operating per vehicle in the fleet, etc.

At operation 130, the fleet capacity determination system may store the determined one or more predicted fleet operational capacity measurements for use in determining a probability distribution for the measurement in subsequent operations. The fleet capacity determination system may also store the one or more fleet parameter values that were used to determine the one or more predicted fleet operational capacity measurements. As described herein, the fleet capacity determination system may use such fleet parameter data in other operations to determine fleet parameter effects on fleet operational capacity measurements, among other operations.

At operation 132, the fleet capacity determination system may determine whether one or more additional predicted fleet operational capacity measurements is to be determined (e.g., whether a threshold number of iterations of predicted fleet operational capacity measurement determinations has been performed). In various examples, the fleet capacity determination system may be configured to perform a threshold number (e.g., 100, 1,000, 50,000, etc.) of predicted fleet operational capacity measurements in order to aggregate the results of such determinations to generate a probability distribution for the predicted fleet operational capacity measurement (e.g., perform a predefined number of Monte Carlo simulations). In various examples, the threshold number of predicted fleet operational capacity measurements may be manually configured and/or may be based on a confidence level or factor (e.g., for a higher confidence result, a higher threshold may be used). Alternatively or additionally, a threshold may be set based on known factors (e.g., running the simulation beyond a particular number of times may not increase the accuracy of the results, therefore the threshold may be set at that number).

If, at operation 132, if the system determines that a threshold number of iterations has not been met, the fleet capacity determination system may return to operation 116 to perform another predicted fleet operational capacity measurement determination by, for example, again sampling predicted fleet parameter distributions to determine values that may then be used to determine a predicted fleet operational capacity measurement that may be included in a predicted fleet operational capacity measurement probability distribution.

If, at operation 132, if the system determines that a threshold number of iterations has been met, the fleet capacity determination system may, at operation 134, determine a predicted fleet operational capacity measurement probability distribution using the accumulated predicted fleet operational capacity measurements determined in previous operations. This probability distribution may then be used by the fleet capacity determination system to perform one or more other operations. For example, the fleet capacity determination system may be configured to automatically identify particular fleet parameters that may be associated with fleet operational capacity measurements of particular types or attributes (e.g., outliers, below or above a threshold, etc.). In various examples, the fleet capacity determination system may, at operation 134, generate an indication of one or more outlier values represented in a determined predicted fleet operational capacity measurement probability distribution and the associated parameter values that may then be stored and/or presented to a user or another system for additional processing. In examples, the fleet capacity determination system may use such probability distributions to control the assignment of operators to test vehicles and/or locations (and/or to other vehicle types and/or locations) for purposes of executing driving tests for data collection and/or performing other functions.

In various examples, as described in more detail herein, the fleet capacity determination system may determine whether the determined predicted fleet operational capacity measurement probability distribution is sufficiently associated with a target measurement or range of measurements. In response to determining that the predicted operational capacity measurement distribution is not associated with the target measurement or range of measurements, the fleet capacity determination system may perform one or more actions that may results in a predicted operational capacity measurement distribution that is sufficiently associated with the target measurement or range of measurements. For example, the fleet capacity determination system may control one or more vehicles to move to or from a location associated with the distribution (e.g., move to/from another location associated with the fleet, move to the location from a manufacturer or surplus vehicle supply, etc.).

An example 136 illustrates example predicted fleet operational capacity measurement probability distributions that may be determined, for example, at operation 134. The distributions of example 136 may be distributions determined for various predicted fleet operational capacity measurements determined based on values for such measurements that were determined based on sampling the probability distributions associated with such parameters as described herein. In various examples, a fleet capacity determination system may be configured to determine one or more predicted fleet operational capacity measurement probability distributions for one or more corresponding fleet operational capacity measurements. For example, distribution 136a may be a predicted fleet operational capacity measurement probability distribution for a fleet capacity measurement 138, indicating the probability 140 of various values fleet capacity measurement 138 predicted for time t+x. Examples 136b and 136c may represent predicted fleet operational capacity measurement probability distributions for other fleet capacity measurements at the same time and/or different times. Alternatively, examples 136b and 136c may represent predicted fleet operational capacity measurement probability distributions for the fleet capacity measurement 138 at different times.

Figure 2:
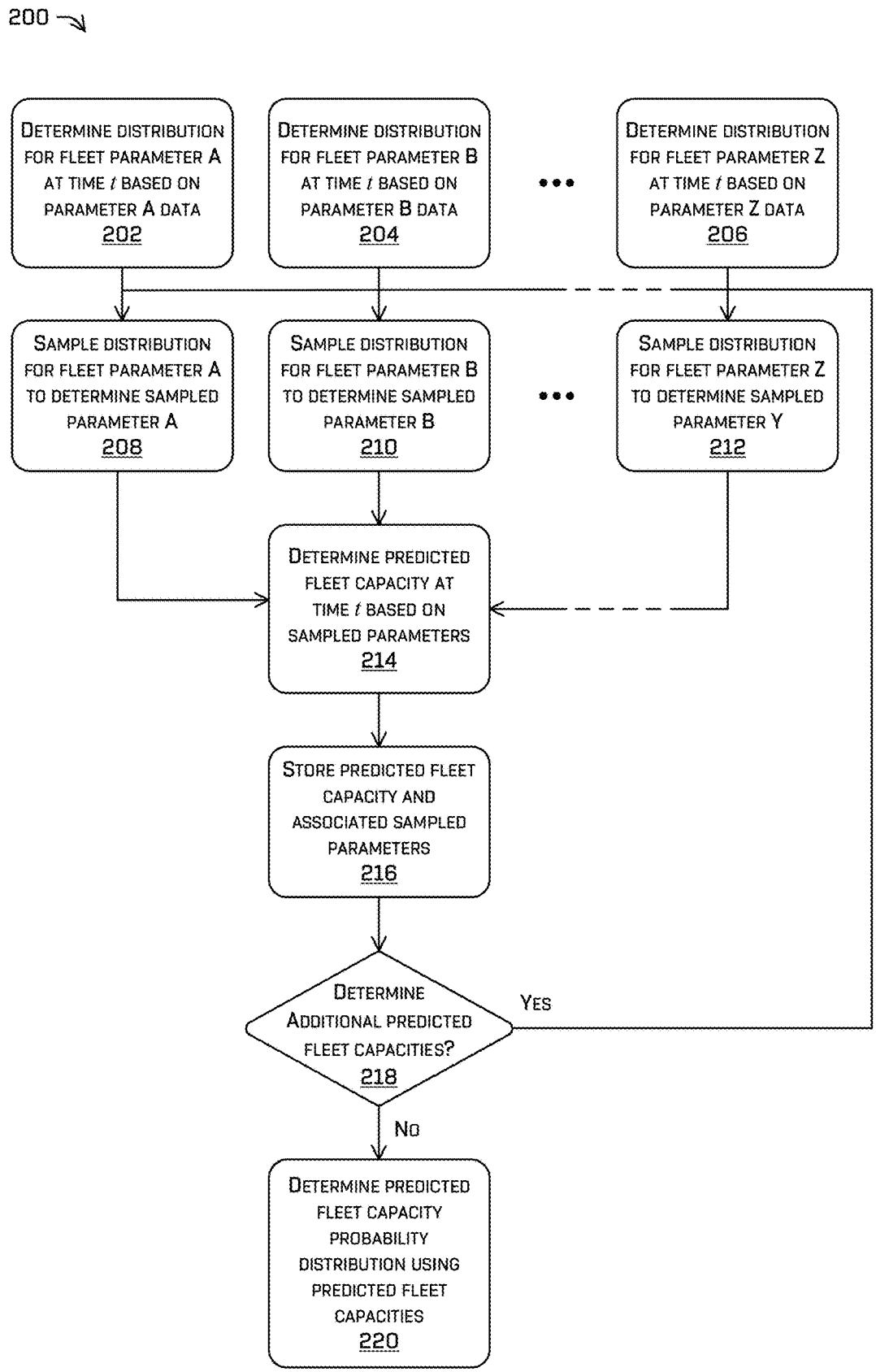
FIG. 2 illustrates another example process for determining a probability distribution of an operational capacity measurement for a fleet of vehicles, in accordance with examples of the disclosure.

FIG. 2 is a flow diagram of an example process 200 for determining a probability distribution for a predicted fleet operational capacity measurement using multiple fleet parameters. In examples, one or more operations of the process 200 may be implemented by using a fleet capacity determination system and/or a vehicle computing system, such as by using one or more of the components and systems illustrated in FIGS. 6 and 7 and described below. For example, one or more components and systems can include those associated with the fleet capacity determination system 600 illustrated in FIG. 6 and/or the vehicle operational and condition data determination component 732, the fleet capacity determination component 752, processors 716 and/or 744, and/or memories 718 and/or 746 illustrated in FIG. 7. In examples, the one or more operations of the process 200 may be performed by a remote system in communication with a vehicle, such as computing device 742 (e.g., executing the fleet capacity determination component 752) illustrated in FIG. 7. In still other examples, the one or more operations of the process 200 may be performed by a combination of a remote system and a vehicle computing system. However, the process 200 is not limited to being performed by such components and systems, and the components and systems of FIGS. 6 and 7 are not limited to performing the process 200.

The example process 200 illustrates the use of multiple fleet parameters in determining a probability distribution for a predicted fleet operational capacity measurement. At operation 202, a distribution for a fleet parameter A at a particular time t may be determined using parameter data for parameter A. In various examples, the distribution for parameter A determined at operation 202 may be based on historical parameter data for parameter A (e.g., time t may be a current, recent, or historical time). Alternatively, the distribution for parameter A determined at operation 202 may be based on predicted parameter data for parameter A (e.g., time t may be a future time). For example, a fleet capacity determination system may determine a predicted distribution for a particular fleet parameter at a first future time. The fleet capacity determination system may then determine a predicted distribution for the particular fleet parameter at a second, later future time based on the predicted distribution for the parameter determined for the first future time. In various examples, the predicted distribution for the fleet parameter at the second time may also be based on a rate of change determined by the fleet capacity determination system for that parameter. In examples, this rate of change may be determined based on multiple historical distributions for the parameter as described herein. The predicted distribution for the fleet parameter at the second time may also, or instead, be determined using one or more modeling or fitting techniques that may be specific to the parameter or type of parameter and/or generalized.

At operation 204, a distribution for a fleet parameter B at the particular time t may be determined using parameter data for parameter B and, in examples, similar operations as performed for parameter A in operation 202. Distributions for any number of other fleet parameters may be determined at various other operations, including operation 206 where a distribution for a fleet parameter B at the particular time t may be determined using the techniques and operations described herein.

At operation 208, the distribution for the fleet parameter A at time t may be sampled to determine a sampled parameter A value. This sampling may be random and/or weighted using one or more techniques. As will be appreciated, because the probability distribution of values for the fleet parameter A is being sampled to determine a parameter value for use in a predicted fleet operational capacity measurement determination, the values having a higher probability in the distribution are more likely to be selected as the sampled parameter A value than values having lower probabilities. However, due to the random selection of the sampled value lower probability values may still be selected as the sampled parameter value. Similarly at operations 210 and 212, sampled parameter values for those parameters at time t may also be determined for use in determining the predicted fleet operational capacity measurement for time t. Other sampled parameter values for other parameters may also be determined for use in determining the predicted fleet operational capacity measurement.

At operation 214, the sampled parameter values determined at operations 208, 210, 212, and any other applicable parameter value sampling operations may be used to determine a predicted fleet operational capacity measurement for a future time t. This measurement may be any predicted fleet operational capacity measurement, including those described herein. For example, at operation 214, using the sampled values for parameters A, B, Z, and any other applicable parameters, the fleet capacity determination system may determine a predicted total number of miles and/or amount of time driven for the fleet, a predicted average number of miles and/or amount of time driven per vehicle in the fleet, a predicted total number of miles and/or amount of time driven autonomously for the fleet, a predicted average number of miles and/or amount of time driven autonomously per vehicle in the fleet, a predicted total number of miles and/or amount of time driven under the control of an operator (e.g., remote operator) for the fleet, a predicted average number of miles and/or amount of time driven under the control of an operator per vehicle in the fleet, a predicted average vehicle speed for the time period, a predicted total amount of time parked while operating for the fleet, a predicted average amount of time parked while operating per vehicle in the fleet, etc.

At operation 216, the fleet capacity determination system may store data representing the determined predicted fleet operational capacity measurement and the parameter values used to determine that measurement, along with any associated data. This data may be used by the fleet capacity determination system may use such fleet parameter data to determine fleet parameter effects on fleet operational capacity measurements, improve fleet and vehicle condition and performance, etc.

At operation 218, the fleet capacity determination system may determine whether one or more additional predicted fleet operational capacity measurements may be determined. In various examples, the fleet capacity determination system may perform this operation by comparing a number of such measurements determined thus far to a threshold quantity of measurements that the fleet capacity determination system may be configured to perform (e.g., to perform a predefined number of Monte Carlo simulations).

If there are one or more further predicted fleet operational capacity measurements to be performed, the fleet capacity determination system may return to operations 208, 210, 212, and any other applicable parameter value sampling operations to sample parameter values for the associated fleet parameters from their corresponding fleet parameter distributions. The fleet capacity determination system may again use such sampled parameter values to determine another predicted fleet operational capacity measurement for time t, and so forth, until the threshold number of predicted fleet operational capacity measurements for time t have been accumulated.

If, at operation 218, the fleet capacity determination system determines that a sufficient or threshold number of predicted fleet operational capacity measurements have been determined, at operation 220 the fleet capacity determination system may use the predicted fleet operational capacity measurements to determine a probability distribution for the predicted fleet operational capacity measurement indicating, for example, the likelihood of the individual predicted fleet operational capacity measurement values occurring at time t.

Figure 3:
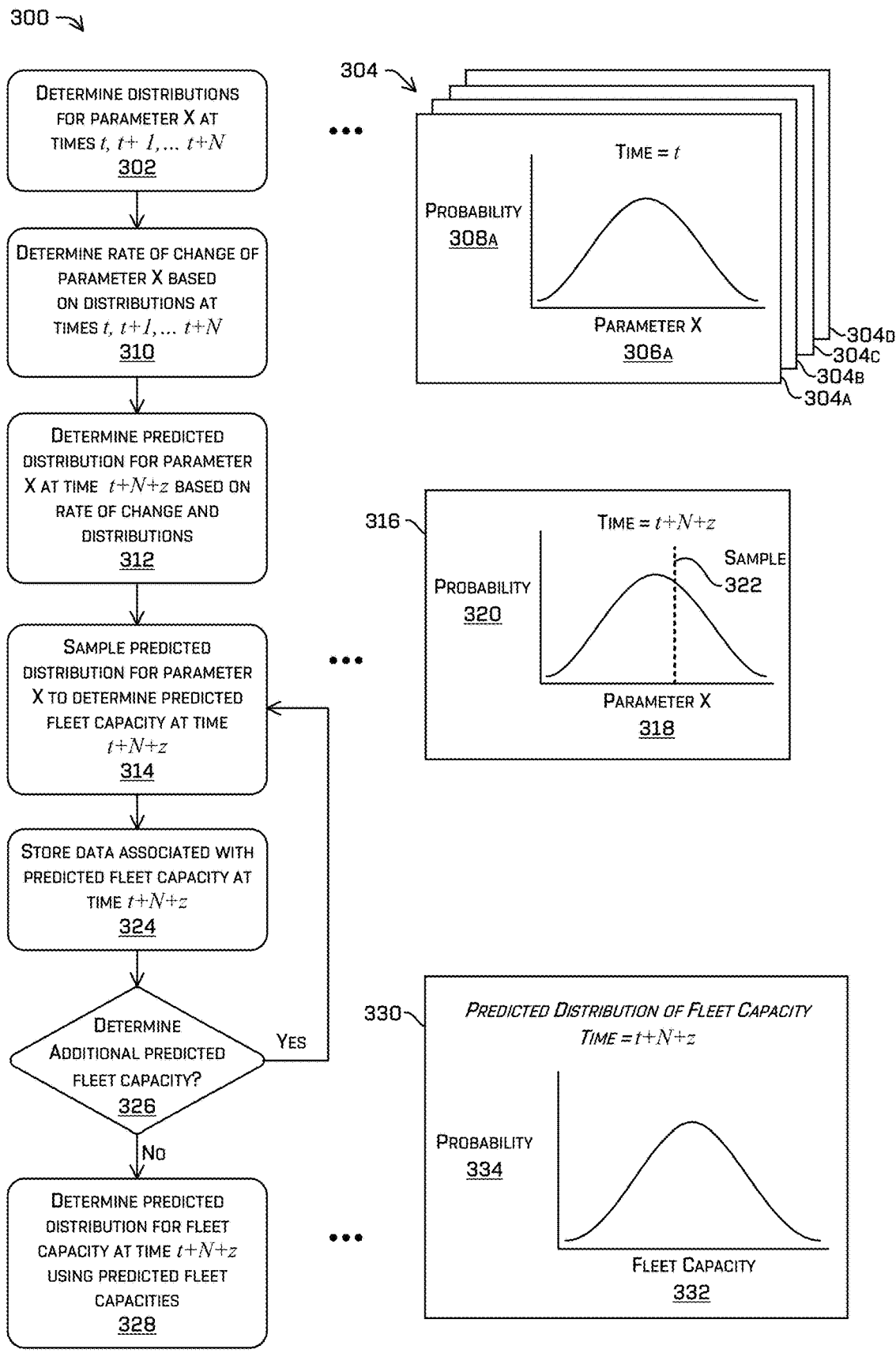
FIG. 3 illustrates an example process for determining a predicted probability distribution for an operational capacity measurement for a fleet of vehicles based on fleet parameter data, in accordance with examples of the disclosure.

FIG. 3 is a pictorial flow diagram of an example process 300 for determining a probability distribution for a predicted fleet operational capacity measurement using a fleet parameter distribution adjusted for a rate of change of the parameter. In examples, one or more operations of the process 300 may be implemented by using a fleet capacity determination system and/or a vehicle computing system, such as by using one or more of the components and systems illustrated in FIGS. 6 and 7 and described below. For example, one or more components and systems can include those associated with the fleet capacity determination system 600 illustrated in FIG. 6 and/or the vehicle operational and condition data determination component 732, the fleet capacity determination component 752, processors 716 and/or 744, and/or memories 718 and/or 746, illustrated in FIG. 7. In examples, the one or more operations of the process 300 may be performed by a remote system in communication with a vehicle, such as computing device 742 (e.g., executing the fleet capacity determination component 752) illustrated in FIG. 7. In still other examples, the one or more operations of the process 300 may be performed by a combination of a remote system and a vehicle computing system. However, the process 300 is not limited to being performed by such components and systems, and the components and systems of FIGS. 6 and 7 are not limited to performing the process 300.

The example process 300 illustrates the use of multiple distributions over time for a particular fleet parameter to determine a rate of change for the parameter. This determined rate of change may then be used to determine an adjusted distribution for the parameter from which a sampled value of the parameter may be determined for using in determining a probability distribution for a predicted fleet operational capacity measurement. At operation 302, two or more distributions for a particular parameter may be determined. In various examples, these distributions may be determined using historical data. For example, daily or hourly parameter data may be used to determine a distribution of parameter values for a particular month. Alternatively or additionally, these distributions may be predicted distributions that may be based on distributions determined using historical data and/or other predicted distributions. For example, one or more predicted distributions may be determined (e.g., using one or more operations of process 300 and/or one or more other operations) and then used as the basis for determining other predicted distribution for subsequent times as described in this process.

An example 304 illustrates example fleet parameter distributions for various times that may be determined using historical and/or predicted parameter data. For example, probability distribution 304*a* may represent a distribution of values for parameter X 306*a* and the probability 308*a* associated with such values for a time t. Example probability distributions 304*b*, 304*c*, and 304*d* may represent distributions of values for parameter X and associated probabilities for other times (e.g., previous or subsequent times). For example, probability distributions 304*b*, 304*c*, and 304*d* may represent distributions of values for parameter X and associated probabilities for times t+1, t+2, . . . t+N, where N is a unit of time (e.g., a month, a week, a day, etc.).

At operation 310, a rate of change for the parameter over time may be determined using the probability distributions determined at operation 302. For example, based on a monthly distributions reflecting a year's worth of parameter data, a fleet capacity determination system may determine that the mean value of the parameter has increased by 5% on average month over month. The fleet capacity determination system may therefore determine a monthly rate of change for the parameter of 5%.

At operation 312, using the determined rate of change and one or more distributions for the parameter, the fleet capacity determination system may determine a predicted distribution for the parameter for a future time. For example, the fleet capacity determination system may adjust a most recent distribution using the determined rate of change and/or one or more one or more modeling or distribution fitting techniques to determine a predicted distribution for the parameter that accounts for predicted changes in the parameter. As noted, this predicted distribution for the parameter may be based on historical distributions and a rate of change. For example, the fleet capacity determination system may determine a predicted distribution based for the parameter for a future time period using a most recent historical distribution for a similar time period adjusted based on the determined rate of change. Alternatively or additionally, the fleet capacity determination system may determine a second predicted distribution based for the parameter for a subsequent future time period using a first predicted distribution for a time period (e.g., earlier) in the future, adjusting the first predicted distribution based on the determined rate of change to determine the second predicted distribution.

At operation 314, the predicted distribution for the parameter may be sampled for use in determining a predicted fleet operational capacity measurement for a future time. The distribution may be randomly sampled or sampled based on weighting or one or more other techniques. In performing this determination, one or more other fleet parameters may also be sampled or otherwise used to determine a predicted fleet operational capacity measurement.

An example 316 illustrates an example predicted fleet parameter distribution that may be sampled to determine a predicted fleet operational capacity measurement for a future time. For example, probability distribution 316 may represent a distribution of values for parameter X 318 and the probability 320 associated with such values for a time t+N+z, where t+N is the most recent time associated with the distributions of example 304 and z represents an additional period time. The parameter value associated with sample 322 from the distribution 316 may be used, at least in part, to determine the value of predicted fleet operational capacity measurement for the time t+N+z.

At operation 324, the fleet capacity determination system may store the predicted fleet operational capacity measurement value determined at operation 314 for use in determining a probability distribution for the measurement in subsequent operations. The fleet capacity determination system may also store the sampled parameter value determined at operation 314 that was used to determine the predicted fleet operational capacity measurement. As described herein, the fleet capacity determination system may use such fleet parameter to data in other operations to determine fleet parameter effects on fleet operational capacity measurements, among other operations.

At operation 326, the fleet capacity determination system may determine whether to determine additional predicted fleet operational capacity measurements (e.g., whether a threshold number of iterations of predicted fleet operational capacity measurement determinations has been performed). If, at operation 326, the system determines that one or more additional predicted fleet operational capacity measurements are to be determined, the fleet capacity determination system may return to operation 314 to resample the predicted fleet parameter distribution and determine another predicted fleet operational capacity measurement that may be included in a predicted fleet operational capacity measurement probability distribution.

If, at operation 326, the system determines that no other predicted fleet operational capacity measurements are to be determined, the fleet capacity determination system may, at operation 328, determine a predicted fleet operational capacity measurement probability distribution using the accumulated predicted fleet operational capacity measurements determined in previous operations. As noted, this probability distribution may be used by the fleet capacity determination system to perform one or more other operations to improve vehicle and fleet performance, safety, and condition.

An example 330 illustrates an example predicted fleet operational capacity measurement probability distribution for the time t+N+z that may be determined, for example, at operation 328. The distribution of example 330 may be a probability distribution of the predicted fleet operational capacity measurements determined based on values for such measurements that were determined based on sampling the predicted probability distribution associated with the particular parameter X as described above. The probability distribution of example 330 may be a predicted fleet operational capacity measurement probability distribution for a fleet capacity measurement 332, indicating the probability 334 of various values fleet capacity measurements 332 predicted for time t+N+z.

Figure 4:
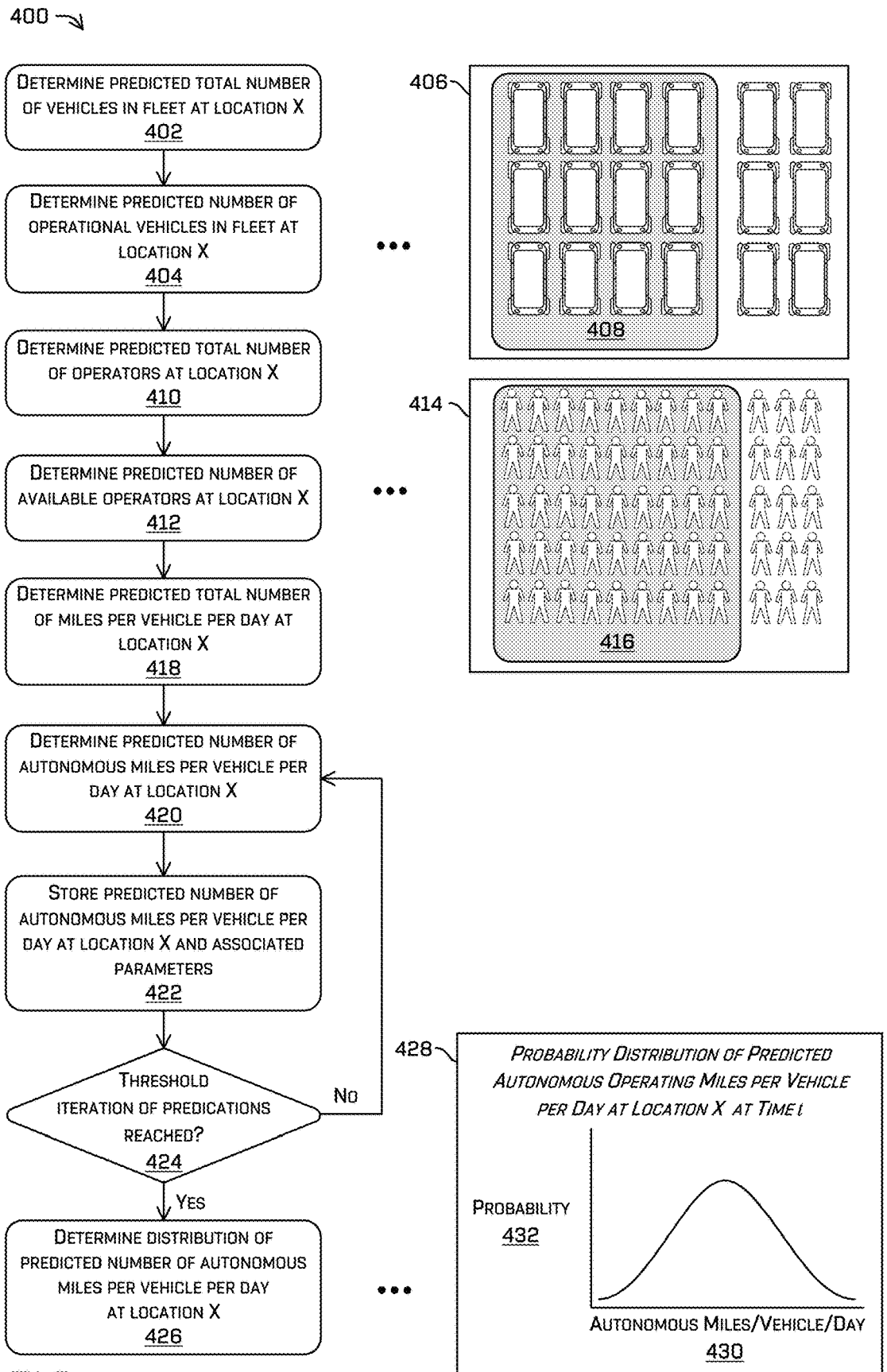
FIG. 4 illustrates an example process for determining a probability distribution of predicted numbers of miles driven autonomously per day per autonomous vehicle in a fleet of vehicles, in accordance with examples of the disclosure.

FIG. 4 is a pictorial flow diagram of an example process 400 for determining a probability distribution for a predicted number of autonomous miles driven per day per vehicle in a particular location. In examples, one or more operations of the process 400 may be implemented by using a fleet capacity determination system and/or a vehicle computing system, such as by using one or more of the components and systems illustrated in FIGS. 6 and 7 and described below. For example, one or more components and systems can include those associated with the fleet capacity determination system 600 illustrated in FIG. 6 and/or the vehicle operational and condition data determination component 732, the fleet capacity determination component 752, processors 716 and/or 744, and/or memories 718 and/or 746, illustrated in FIG. 7. In examples, the one or more operations of the process 400 may be performed by a remote system in communication with a vehicle, such as computing device 742 (e.g., executing the fleet capacity determination component 752) illustrated in FIG. 7. In still other examples, the one or more operations of the process 400 may be performed by a combination of a remote system and a vehicle computing system. However, the process 400 is not limited to being performed by such components and systems, and the components and systems of FIGS. 6 and 7 are not limited to performing the process 400.

The example process 400 illustrates the use of particular fleet parameters and parameter distributions to determine a probability distribution for a particular predicted fleet operational capacity measurement, autonomous operation miles per vehicle per data at a particular location. At operation 402, a fleet capacity determination system may determine a predicted value for a fleet parameter of a total number of vehicles in a fleet at a particular location. Alternatively, at operation 402, a distribution of predicted values for the fleet parameter of the total number of vehicles in the fleet at the particular location may be determined. This distribution may be determined based on one or more historical distributions and/or one or more other predicted distributions. In examples, this distribution may also, or instead, be determined based on a rate of change over time of the total number of vehicles in the fleet at the particular location, determined as described herein. In examples, this distribution may also, or instead, be determined using one or more modeling and/or distribution fitting techniques.

At operation 404, the fleet capacity determination system may determine a predicted value for a fleet parameter of a number of operational vehicles in the fleet at the particular location. Alternatively, at operation 404, a distribution of predicted values for the fleet parameter of the number of operational vehicles in the fleet at the particular location may be determined. This distribution may be determined based on one or more historical distributions and/or one or more other predicted distributions associated with total numbers of vehicles in the fleet at the particular location (e.g., as used in operation 402) and/or numbers of operational vehicles in the fleet at the particular location. In examples, this distribution may also, or instead, be determined based on a rate of change over time of the number of operational vehicles in the fleet at the particular location, determined as described herein. In examples, this distribution may also, or instead, be determined using one or more modeling and/or distribution fitting techniques. In examples, other modeling techniques may be used, for example based on the total numbers of vehicles in the fleet at the particular location and/or other data, to determine a distribution of a predicted number of operational vehicles in the fleet at the location.

An example 406 illustrates an example predicted fleet parameter representing a total number of vehicles in a fleet at a particular location predicted for a particular time that may be determined, for example, at operation 402. The parameter value illustrated in example 406 may represent an individual parameter value in a probability distribution for the predicted total number of vehicles in the fleet at the particular location for the particular time. The example 406 further illustrates the predicted fleet parameter 408 representing a number of operational vehicles in the fleet at the particular location predicted for the particular time that may be determined, for example, at operation 404. The parameter value 408 illustrated in this example may represent an individual parameter value in a probability distribution for the predicted number of operational vehicles in the fleet at the particular location for the particular time.

At operation 410, the fleet capacity determination system may determine a predicted value for a fleet parameter of a total number of operators associated with the fleet at the particular location. Alternatively, at operation 410, a distribution of predicted values for the fleet parameter of the total number of operators associated with the fleet at the particular location may be determined. This distribution may be determined based on one or more historical distributions and/or one or more other predicted distributions. In examples, this distribution may also, or instead, be determined based on a rate of change over time of the total number of operators associated with the fleet at the particular location, determined as described herein. In examples, this distribution may also, or instead, be determined using one or more modeling and/or distribution fitting techniques.

At operation 412, the fleet capacity determination system may determine a predicted value for a fleet parameter of a number of available operators associated with the fleet at the particular location. Alternatively, at 412, a distribution of predicted values for the fleet parameter of the number of available operators associated with the fleet at the particular location may be determined. Here again, this distribution may be determined based on one or more historical distributions and/or one or more other predicted distributions associated with total numbers of operators associated with the fleet at the particular location (e.g., as used in operation 410) and/or numbers of available operators associated with the fleet at the particular location. In examples, this distribution may also, or instead, be determined based on a rate of change over time of the number of available operators associated with the fleet at the particular location, determined as described herein. In examples, this distribution may also, or instead, be determined using one or more modeling and/or distribution fitting techniques. In examples, other modeling techniques may be used, for example based on the total number of operators associated with the fleet at the particular location and/or other data, to determine a distribution of a predicted number of available operators associated with the fleet at the particular location.

An example 414 illustrates an example predicted fleet parameter representing a total number of number of operators associated with the fleet at the particular location predicted for a particular time that may be determined, for example, at operation 410. The parameter value illustrated in example 410 may represent an individual parameter value in a probability distribution for the predicted total number of operators associated with the fleet at the particular location for the particular time. The example 406 further illustrates the predicted fleet parameter 416 representing a number of available operators associated with the fleet at the particular location predicted for the particular time that may be determined, for example, at operation 412. The parameter value 416 illustrated in this example may represent an individual parameter value in a probability distribution for the predicted number of available operators associated with the fleet at the particular location for the particular time.

At operation 418, the fleet capacity determination system may determine a predicted value for a fleet parameter of a total number of miles driven per vehicle in the fleet at the particular location. Alternatively, at operation 418, a distribution of predicted values for the fleet parameter of the total number of miles driven per vehicle in the fleet at the particular location may be determined. Here again, this distribution may be determined based on one or more historical distributions and/or one or more other predicted distributions. In examples, this distribution may also, or instead, be determined based on a rate of change over time of the total number of miles driven per vehicle in the fleet at the particular location, determined as described herein. In examples, this distribution may also, or instead, be determined using one or more modeling and/or distribution fitting techniques.

At operation 420, the fleet capacity determination system may determine a predicted value for a fleet operational capacity measurement of a number of autonomously driven miles per vehicle per day in the fleet at the particular location. This value may be determined based on sampling the distributions associated with the previous operations, such as the total number of miles driven per vehicle in the fleet at the particular location (e.g., as used in operation 418), the total number of vehicles in the fleet at the particular location (as used in operation 402), the number of operational vehicles in the fleet at the particular location (as used in operation 404), the total number of operators associated with the fleet at the particular location (as used in operation 410), and/or the number of available operators associated with the fleet at the particular location (as used in operation 412).

At operation 422, the fleet capacity determination system may store the predicted number of autonomously driven miles per vehicle per day in the fleet at the particular location determined at operation 422 for use in determining a probability distribution for the measurement in subsequent operations. The fleet capacity determination system may also store the sampled parameter values determined at operations 402, 404, 410, 412, and/or 418 that may have been used to determine the predicted number of autonomously driven miles per vehicle per day in the fleet at the particular location. As described herein, the fleet capacity determination system may use such fleet parameter to data in other operations to determine fleet parameter effects on fleet operational capacity measurements, among other operations.

At operation 424, the fleet capacity determination system may determine whether to determine additional predicted numbers of autonomously driven miles per vehicle per day in the fleet at the particular location (e.g., based on a threshold number of such predictions). If, at operation 424, the system determines that one or more additional predicted numbers of autonomously driven miles per vehicle per day at the particular location are to be determined, the fleet capacity determination system may return to operation 420 to resample the predicted fleet parameter of distributions of operations 402, 404, 410, 412, and/or 418 and determine another predicted number of autonomously driven miles per vehicle per day at the particular location that may be included in a probability distribution for the predicted numbers of autonomously driven miles per vehicle per day at the particular location.

If, at operation 424, the system determines that no other predicted numbers of autonomously driven miles per vehicle per day at the particular location are to be determined, the fleet capacity determination system may, at operation 426, determine a probability distribution for the predicted numbers of autonomously driven miles per vehicle per day at the particular location using the accumulated predicted numbers determined in previous iterations of operation 420. As noted, this probability distribution may be used by the fleet capacity determination system to perform one or more other operations to improve vehicle and fleet performance, safety, and condition.

An example 428 illustrates an example probability distribution for predicted numbers of autonomously driven miles per vehicle per day at a particular location at a time t that may be determined, for example, at operation 426. The distribution of example 428 may be a probability distribution of the numbers of autonomously driven miles determined using the parameter sampling operations and other operations as described herein. The probability distribution of example 428 may be a predicted fleet operational capacity measurement probability distribution for a number of autonomously driven miles per vehicle per day 430, indicating the probability 432 of various values of autonomously driven miles per vehicle per day 430 predicted time t.

Figure 5:
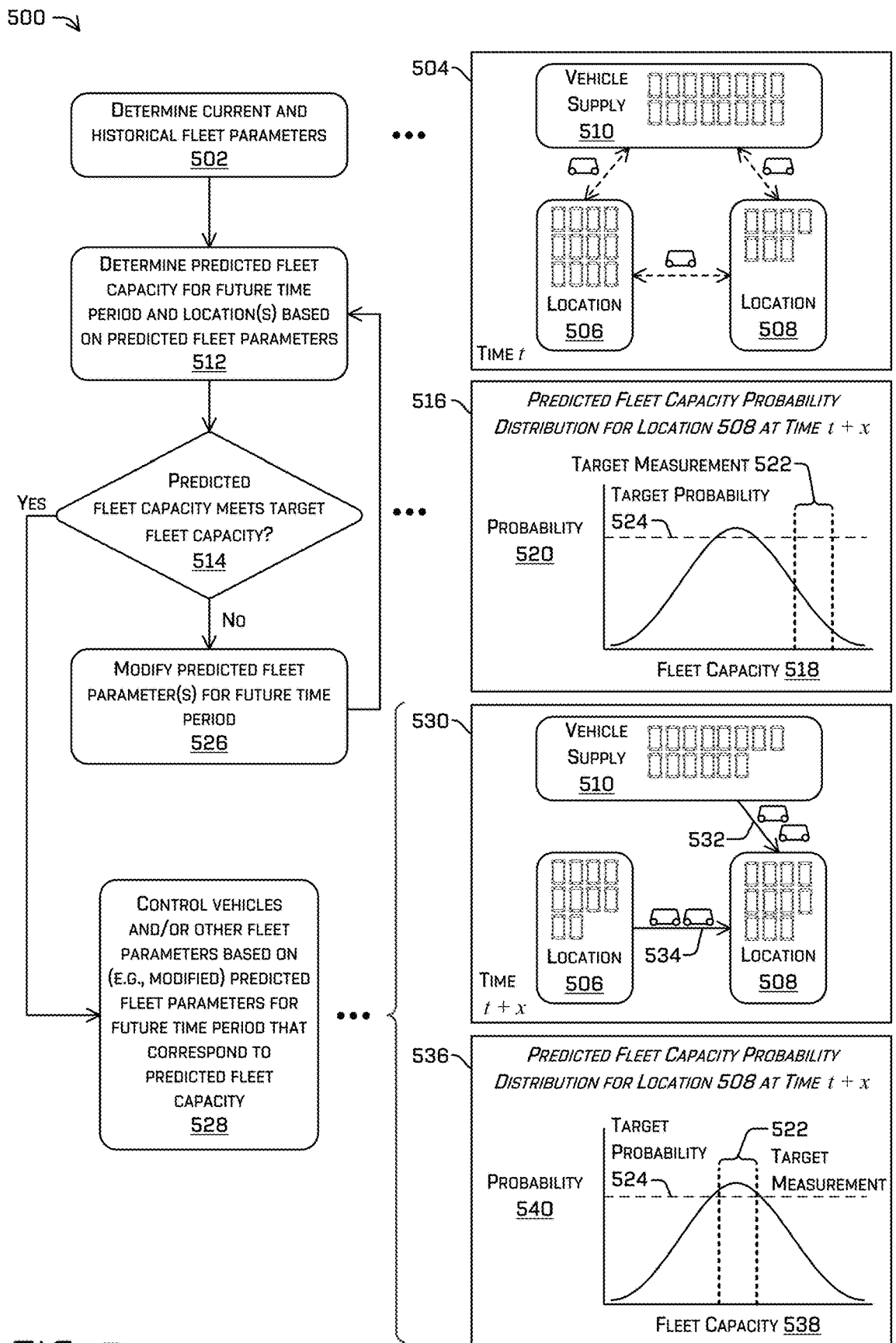
FIG. 5 illustrates an example process for controlling one or more vehicles based on one or more distributions of predicted fleet capacity measurements and/or one or more distributions of predicted fleet parameters, in accordance with examples of the disclosure.

FIG. 5 is a pictorial flow diagram of an example process 500 for controlling one or more vehicles based on one or more determinations of fleet parameters, fleet capacity measurements, and/or associated distributions. In examples, one or more operations of the process 500 may be implemented by using a fleet capacity determination system and/or a vehicle computing system, such as by using one or more of the components and systems illustrated in FIGS. 6 and 7 and described below. For example, one or more components and systems can include those associated with the fleet capacity determination system 600 illustrated in FIG. 6 and/or the vehicle operational and condition data determination component 732, the fleet capacity determination component 752, processors 716 and/or 744, and/or memories 718 and/or 746, illustrated in FIG. 7. In examples, the one or more operations of the process 500 may be performed by a remote system in communication with a vehicle, such as computing device 742 (e.g., executing the fleet capacity determination component 752) illustrated in FIG. 7. In still other examples, the one or more operations of the process 500 may be performed by a combination of a remote system and a vehicle computing system. However, the process 500 is not limited to being performed by such components and systems, and the components and systems of FIGS. 6 and 7 are not limited to performing the process 500.

The example process 500 illustrates the use of probability distributions of predicted fleet operational capacity measurements to control vehicles in a fleet to, for example, meet one or more target fleet capacity measurements. At operation 502, current and/or historical fleet vehicle operational parameter data (e.g., fleet parameters) may be determined, for example, as described herein. This may include data associated with one or more particular locations at which subsets of vehicles in a fleet may be located and/or data associated with various historical time periods.

An example 504 illustrates an exemplary fleet and subsets of the vehicles in the fleet at different locations. This representation of the example fleet 504 may represent the state of the fleet at time t. A first subset of the vehicles in the example fleet 504 may be located at location 506 and a second subset of the vehicles in the example fleet 504 may be located at location 506. Another subset of the vehicles in the example fleet 504 may be located at vehicle supply 510, which may be at another location associated with or otherwise accessible to the fleet, such as a manufacturer, vehicle storage facility, etc. Vehicle supply 510 may also, or instead, be a fleet location similar to locations 506 and 508 at which operational vehicles may be associated. The vehicles at locations 506 and 508 and vehicle supply 510 may be capable of being controlled or otherwise transported between each such location. For example, the locations 506 and 508 and vehicle supply 510 may be relatively proximate to one another geographically (e.g., within a same metropolitan area). The vehicles in the fleet of example 504 may include autonomous vehicles. A fleet capacity determination system and/or a system associated therewith may be configured to control such autonomous vehicles to move between any combination of locations 506 and 508 and vehicle supply 510.

Note that in various examples, rather than being assigned or otherwise associated with particular locations, vehicles in a fleet may also or instead be divided into subsets based on function. For example, a subset of vehicles in a fleet may be assigned to a mapping function (e.g., mapping of the environment to gather data for use by autonomous vehicles) while another subset of the fleet may be assigned to a passenger service function. Any of the measurements, parameters, and distributions described herein may be determined based on particular vehicle functions or other assigned operations instead of, or in addition to, vehicle location. For example, the locations 506 and 508 of the example 504 may instead represent vehicle functions 506 and 508 that may be distinct from one another.

At operation 512, the fleet capacity determination system may determine one or more predicted fleet capacity measurements and/or associated probability distributions based on the data determined at operation 502. In various examples, these predicted measurements and/or distributions may be determined for a particular time period and a particular location. For example, the one or more predicted fleet capacity measurements and/or associated probability distributions determined at operation 512 may be determined using the techniques described herein.

At operation 514, the fleet capacity determination system may determine whether the one or more predicted fleet capacity measurements and/or associated probability distributions determined at operation 512 satisfy a target fleet capacity measurement or range of measurements. For example, a fleet capacity determination system may determine a target operational capacity range of measurements for a particular fleet location and a particular future period of time. The fleet capacity determination system may determine whether the distribution of predicted fleet operational capacity measurements for that location and time period includes the target operational capacity range of measurements and, if so, whether the target operational capacity range of measurements are of sufficient probability. For example, if the target operational capacity range of measurements is represented in a sufficiently high probability portion of the distribution, the fleet capacity determination system may determine that the target operational capacity is met. If the target operational capacity range of measurements is represented in an insufficiently high probability portion of the distribution, the fleet capacity determination system may determine that the target operational capacity is not met.

In a particular example, a target operational capacity measurement may be a number of hours of autonomous operation per vehicle in a particular location of 8-10 hours per day. An associated target probability may be 60% (e.g., 60% or higher). A probability distribution for corresponding predicted operational capacity measurements may indicate that, at an associated future time period, the probability of achieving 8-10 hours per day of autonomous operation per vehicle in the particular location is insufficiently high (e.g., less than 60%). The fleet capacity determination system may determine, therefore, that the target measurement and associated probability is not met using the fleet parameters associated with the probability distribution for these predicted operational capacity measurements. Alternatively, if the probability distribution for corresponding predicted operational capacity measurements indicates that, at the associated future time period, the probability of achieving 8-10 hours per day of autonomous operation per vehicle in the particular location is sufficiently high (e.g., 60% or higher), the fleet capacity determination system may determine that the target measurement and associated probability is met using the fleet parameters associated with that probability distribution of operational capacity measurements.

An example 516 illustrates an example probability distribution and target measurements and probability for the location 508 of the example 504 at a future time t+x. The distribution of example 516 may be a distribution of predicted fleet capacity measurements 518 and associated probabilities 520 of such measurements 518 occurring at location 508 at time t+x. A target measurement range 522 may represent a range of target measurements, for example, as determined by a fleet capacity determination system. Continuing the example above, the target measurement 522 may be a range of 8-10 hours per day of autonomous operation per vehicle per day at location 508 in a particular future month (represented as time t+x). The target probability 522 may represent a target probability for the target measurement 522. In the autonomous operation per vehicle per day example, the target probability 522 may be 60%. As shown in this example, the target measurement 522 is represented in the example distribution at probabilities that are less than the target probability 524, and therefore the probability distribution of operational capacity measurements of example 516 does not meet the target measurement 522 at a sufficient probability 524.

If, at operation 514, the fleet capacity determination system determines that the one or more predicted fleet capacity measurements and/or associated probability distributions determined at operation 512 do not satisfy the target fleet capacity measurement or range of measurements, the fleet capacity determination system may, at operation 526, modify one or more of the fleet parameters used to determine the one or more predicted fleet capacity measurements and/or associated probability distributions and return to operation 512 to determine one or more adjusted predicted fleet capacity measurements and/or associated probability distributions based on the modified fleet parameters. The fleet capacity determination system may determine one or more fleet parameter adjustments based on outlier analysis and/or any other available data that may be used to determine one or more predicted fleet capacity measurements. For example, the fleet capacity determination system may modify (e.g., iteratively or in parallel) one or more (e.g., all) of the fleet parameters randomly to determine various resulting distributions of predicted fleet capacity measurements. The fleet capacity determination system may analyze such resulting distributions to identify those that meet the target fleet capacity measurement or range of measurements and associated target probability. Other techniques may be used to determine one or more predicted fleet capacity measurements and/or associated probability distributions.

If at operation 514, the fleet capacity determination system determines that the one or more predicted fleet capacity measurements and/or associated probability distributions determined at operation 512 satisfy the target fleet capacity measurement or range of measurements, the fleet capacity determination system may, at operation 528, implement one or more parameters associated with the one or more satisfactory predicted fleet capacity measurements and/or associated probability distributions. For example, the fleet capacity determination system may control one or more vehicles in the fleet to move to or otherwise be available for use at the location associated with the predicted fleet capacity measurements and/or distributions. Alternatively or additionally, the fleet capacity determination system may generate a shift schedule or otherwise automatically control the availability of one or more operators associated with a fleet location (e.g., schedule one or more operators for particular shifts at particular fleet locations). Other adjustments and/or implementations of one or more fleet parameters in an operating fleet may be performed using the techniques described herein.

An example 530 illustrates the exemplary fleet and subsets of the vehicles in the fleet locations 506 and 508 and vehicle supply 510 introduced above at example 504. In response to determining that adjusting one or more fleet parameters associated with the number of vehicles at the location 508 will increase the likelihood that the subset of the fleet at location 508 will meet the target measurements 522 and the target probability 524, the fleet capacity determination system may move vehicles 532 from the vehicle supply 510 to the location 508. The fleet capacity determination system may also move vehicles 534 from the location 506 to the location 508. This vehicle movement may be implemented by transmitting one or more instructions to these vehicles from the fleet capacity determination system to cause these vehicle to autonomously operate from their current locations to the location 508. The fleet capacity determination system may implement these vehicle control operations such that the vehicles involved in the vehicle moves 532 and 534 may be at the location 508 by time t+x.

An example 536 illustrates an example probability distribution and target measurements and probability for the location 508 at a future time t+x on which the adjustments of example 530 may have been based. The distribution of example 536 may be a distribution of predicted fleet capacity measurements 538 and associated probabilities 540 of such measurements 538 occurring at location 508 at time t+x and based on adjusted fleet parameters that may have been determined, for example, at operation 526. The target measurement range 522 may be the target range of example 516 (e.g., a target measurement of a range of 8-10 hours per day of autonomous operation per vehicle per day at location 508 at time t+x). The target probability 522 may be the target probability for the target measurement 522 of example 516 (e.g., a target probability of 60%). As shown in this example, in the updated and adjusted distribution of 536, the target measurement 522 is represented at probabilities that are greater than or equal to the target probability 524, and therefore the probability distribution of operational capacity measurements of example 536 meets the target measurement 522 at a sufficient probability 524.

FIG. 6 is a block diagram of a fleet capacity determination system 600 according to various examples. The system 600 may be implemented at a remote system, at a vehicle (e.g., an autonomous vehicle) by a vehicle computing system, and/or by a combination of such systems. The system 600 may include one or more of the components and systems illustrated in FIG. 7 and described below. These components may be configured as described herein or in any other configuration and may perform any subset of their associated operations in any or and/or in conjunction with other one or more other operations. For example, one or more components and systems can include those associated with the vehicle operational and condition data determination component 732, the fleet capacity determination component 752, processors 716 and/or 744, and/or memories 718 and/or 746, illustrated in FIG. 7. In examples, the one or more operations performed by the system 600 may be performed by a remote system in communication with a vehicle, such as computing device 742 (e.g., executing the fleet capacity determination component 752) illustrated in FIG. 7. In still other examples, the one or more operations performed by the system 600 may be performed by a combination of a remote system and a vehicle computing system. However, the one or more operations performed by the system 600 are not limited to being performed by such components and systems, and the components and systems of FIG. 7 are not limited to performing the operations performed by the system 600.

In various examples, fleet data store 602 may be accessible to the fleet capacity determination system 600. The fleet data store 602 may include fleet parameters data (e.g., data for fleet parameter X 604, fleet parameter Y 606, fleet parameter Z 608, etc.). In various examples, one or more portions of the fleet parameter data at fleet data store 602 may be transmitted or otherwise provided by vehicles associated with the fleet capacity determination system 600. For example, fleet parameter data stored at the fleet data store 602 may include data such as miles and/or time driven, autonomous miles and/or time driven, miles and or time remote operated, that may be transmitted from an autonomous vehicle to the fleet data 602.

A fleet capacity prediction system 610 configured at the fleet capacity determination system 600 may access the fleet data store 602 and parameter data stored thereon to perform the fleet operational capacity measurement operations described herein. A parameter distribution determination component 612 may be configured at the fleet capacity prediction system 610. The parameter distribution determination component 612 may use the parameter data accessed from the fleet data store 602 to determine distributions for particular parameters. For example, using daily historical parameter data for a particular parameter, the parameter distribution determination component 612 may determine one or more monthly distributions of such parameter data that may be used to determine rates of change, as a basis for determining predicted distributions, etc.

For example, the parameter distribution determination component 612 may provide historical distributions to a parameter rate of change component 614 that may determine, based on such distributions, a rate of change for a corresponding parameter. This rate of change can then be used to determine predicted distributions. The rate of change may be provided by the parameter rate of change component 614 back to the parameter distribution determination component 612 so that the parameter distribution determination component 612 may determine predicted distributions. For example, the parameter distribution determination component 612 may adjust a parameter distribution based on a rate of change received from the parameter rate of change component 614 to determine a predicted distribution for that parameter.

The parameter distribution determination component 612 may store such determined adjusted distributions for future use, for example, at the fleet data 602. The parameter distribution determination component 612 may also, or instead, store rates of change determined for particular parameters for future use. For example, the parameter distribution determination component 612 may determine predicted distributions for parameters using other predicted distributions associated with such parameters, rates of change associated with such parameters, and/or modeling and/or fitting techniques (e.g., generalized techniques and/or techniques specific to the parameter or type of parameter).

The distributions determined by the parameter distribution determination component 612 may be sampled by a parameter sampling component 616 to determine values that may then be used to determine one or more fleet operational capacity measurements. The parameter sampling component 616 may randomly sample parameter distributions to determine such parameter values and/or may employ one or more weightings and/or other techniques to determine a value from a distribution of parameter values. The parameter sampling component 616 may provide the determined parameter values to a predicted fleet capacity determination component 618.

The predicted fleet capacity determination component 618 may determine, in examples using one or more parameter values provided by the parameter sampling component 616, a predicted fleet operational capacity measurement (e.g., such as those described herein). The predicted fleet capacity determination component 618 may store such measurement values in a predicted fleet capacities data store 620 for use in determining probability distributions for such predicted fleet operational capacity measurements.

A predicted fleet capacity distribution determination component 622 may determine, using predicted fleet operational capacity measurements retrieved, for example, from the predicted fleet capacities data store 620, a probability distribution of predicted fleet operational capacity measurements. The predicted fleet capacity distribution determination component 622 may store such determined probability distributions and associated data in a predicted fleet capacity distribution data store 624. For example, to facilitate analysis of such distributions for improving fleet and vehicle operational conditions and efficiency, the predicted fleet capacity distribution determination component 622 may store the parameter data associated with individual predicted fleet operational capacity measurement values included in the probability distribution of a predicted fleet operational capacity measurement in the predicted fleet capacity distribution data store 624.

The predicted fleet capacity distribution determination component 622 may determine various distributions as described herein to determine one or more of such distributions that are associated with a target fleet capacity measurement or range of measurements and one or more associated target probabilities. Those distributions determined to satisfy such targets may be stored in the predicted fleet capacity distribution data store 624, along with the associated fleet parameters, for use by a fleet capacity determination component 626 that may determine whether and how to modify parameters of the operational fleet to facilitate the fleet meeting the target measurement(s) and probabilities at a future time. For example, the fleet capacity determination component 626 may determine that one or more vehicles may be controlled to adjust a fleet parameter and may issue one or more instructions to control such vehicles accordingly. For instance, the fleet capacity determination component 626 may include a vehicle control component 628 that may transmit instructions to one or more vehicles 630 that may cause the vehicle(s) 630 to autonomously control the vehicle(s) 630 to move from one fleet location to another. Any other instructions may be transmitted by the vehicle control component 628 and/or the fleet capacity determination component 626 to adjust, affect, or otherwise implement one or more of any type of fleet parameters and/or vehicle operational data.

FIG. 7 depicts a block diagram of an example system 700 for implementing the techniques described herein. In at least one example, the system 700 can include a vehicle 702. The vehicle 702 can include a vehicle computing system or device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, one or more maps 728, a prediction component 730, and/or a vehicle operational and condition data determination component 732. Though depicted in FIG. 7 as residing in memory 718 for illustrative purposes, it is contemplated that each of the localization component 720, the perception component 722, the planning component 724, the one or more system controllers 726, the one or more maps 728, the prediction component 730, and/or the vehicle operational and condition data determination component 732 can additionally, or alternatively, be accessible to the vehicle 702 (e.g., stored remotely). Alternatively or additionally, the vehicle operational and condition data determination component 732 may be a component of and/or associated with a remote computing device and/or a separate (e.g., secondary) computing device.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein. In some examples, the localization component 720 can provide data, for example to the vehicle operational and condition data determination component 732, that that may be used to determine parameters (e.g., miles and/or time driven) that may be used to determine probability distributions for predicted fleet operational capacity measurements.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use multichannel data structures, such as multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps 728 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 728 can include at least one map (e.g., images and/or a mesh). In some examples, the vehicle 702 can be controlled based at least in part on the maps 728. That is, the maps 728 can be used in connection with the localization component 720, the perception component 722, and/or the planning component 724 to determine a location of the vehicle 702, identify objects in an environment, and/or generate routes and/or trajectories to navigate within an environment. In examples, one or more of these components may interact with the vehicle operational and condition data determination component 732 to determine one or more parameters that may be transmitted to a fleet capacity determination system and/or otherwise used to determine probability distributions for predicted fleet operational capacity measurements.

In some examples, the one or more maps 728 can be stored on a remote computing device(s) (such as the computing device(s) 742) accessible via network(s) 740. In some examples, multiple maps 728 can be stored based on, for example, a characteristic (e.g., type of entity, time of day, day of week, season of the year, etc.). Storing multiple maps 728 can have similar memory requirements but increase the speed at which data in a map can be accessed.

In general, the prediction component 730 can generate predicted trajectories of objects in an environment. For example, the prediction component 730 can generate one or more predicted trajectories for vehicles, pedestrians, animals, and the like within a threshold distance from the vehicle 702. In some instances, the prediction component 730 can measure a trace of an object and generate a trajectory for the object based on observed and predicted behavior. The prediction component 730 may interact with a trajectory determination system, an acceleration determination system, and/or an operational trajectory determination system to determine an operational trajectory, for example, based on one or more candidate trajectories.

In some instances, aspects of some or all of the components discussed herein can include any models, algorithms, and/or machine learning algorithms. For example, in some instances, the components in the memory 718 (and the memory 746, discussed below) can be implemented as a neural network. For instance, the memory 718 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (IDI), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 740, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 742 via the network(s) 740. In some examples, the vehicle 702 can send raw sensor data to the computing device(s) 742. In other examples, the vehicle 702 can send processed sensor data and/or representations of sensor data (e.g., multichannel data structures representing sensor data) to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing one or more perception components 748, planning components 750, a fleet capacity determination component 752, and/or a vehicle control component 754. In some instances, the perception component 748 can substantially correspond to the perception component 722 and can include substantially similar functionality. In some instances, the planning component 750 can substantially correspond to the planning component 724 and can include substantially similar functionality. The fleet capacity determination component 752 may be configured to perform the various operations described herein to determine probability distributions for predicted fleet operational capacity measurements and to control one or more fleet parameters and/or any other vehicle operational control data. The vehicle control component 754 may be configured to perform the various vehicle control operations described herein, for example, based on predicted fleet operational capacity measurements and target measurements and probabilities.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving vehicle operational data associated with a first plurality of autonomous vehicles operating in a first geographical region; determining a plurality of distributions of vehicle operational parameter values based at least in part on the vehicle operational data; determining a rate of change of a vehicle operational parameter based at least in part on the plurality of distributions of the vehicle operational parameter values; determining a first distribution of predicted vehicle operational parameter values based at least in part on the plurality of distributions of the vehicle operational parameter values and the rate of change; determining predicted operational capacity measurement values based at least in part on sampling the first distribution of the predicted vehicle operational parameter values; determining a second distribution of the predicted operational capacity measurement values; and based at least in part on the second distribution of the predicted operational capacity measurement values, controlling one or more vehicles associated with a vehicle supply to the first geographical region, wherein the vehicle supply is associated with the first plurality of autonomous vehicles and a second plurality of autonomous vehicles operating in a second geographical region distinct from the first geographical region.

B: The system of paragraph A, wherein determining the predicted operational capacity measurement values is further based at least in part on sampling a third probability distribution of second predicted vehicle operational parameter values.

C: The system of paragraph A or B, wherein: the operations further comprise: determining, based at least in part on the second distribution of the predicted operational capacity measurement values, a parameter value of the predicted vehicle operational parameter values; and determining an adjusted parameter value based at least in part on the parameter value of the predicted vehicle operational parameter values; and controlling the one or more vehicles is further based at least in part on the adjusted parameter value.

D: The system of paragraph C, wherein the predicted operational capacity measurement values comprise one or more values representing one or more of: a first total number of miles of operation of vehicles in the first plurality of autonomous vehicles for a time period; a second total number of miles autonomous operation of the vehicles in the first plurality of autonomous vehicles for the time period; a first average number of miles of operation per vehicle in the first plurality of autonomous vehicles for the time period; or a second average number of miles of autonomous operation per vehicle in the first plurality of autonomous vehicles for the time period.

E: The system of any of paragraphs A-D, wherein controlling the one or more vehicles is further based at least in part on comparing one or more target operational capacity measurement values to the second distribution of the predicted operational capacity measurement values.

F: One or more non-transitory computer-readable media storing instructions that, when executed by one or more processors, cause the one or more processors to perform operations comprising: determining vehicle operational parameter data based at least in part on data received from a plurality of autonomous vehicles in a subset of a fleet of vehicles; determining a first probability distribution of vehicle operational parameter values based at least in part on the vehicle operational parameter data and a rate of change of a vehicle operational parameter associated with the vehicle operational parameter values; determining a second probability distribution of predicted operational capacity measurement values based at least in part on the first probability distribution of the vehicle operational parameter values; associating the predicted operational capacity measurement values with corresponding vehicle operational parameter values in a computer memory; and based at least in part on the second probability distribution of predicted operational capacity measurement values, operating one or more vehicles associated with a vehicle supply associated with the fleet of vehicles to a geographical region associated with the subset of the fleet of vehicles.

G: The one or more non-transitory computer-readable media of paragraph F, wherein determining the second probability distribution of the predicted operational capacity measurement values comprises iteratively determining the predicted operational capacity measurement value; sampling the first probability distribution to determine a vehicle operational parameter value; and determining a predicted operational capacity measurement value based at least in part on the vehicle operational parameter value.

H: The one or more non-transitory computer-readable media of paragraph G, wherein iteratively determining the predicted operational capacity measurement values comprises iteratively determining a threshold quantity of the predicted operational capacity measurement values.

I: The one or more non-transitory computer-readable media of paragraph G, wherein iteratively determining the predicted operational capacity measurement values comprises: sampling a third probability distribution of second vehicle operational parameter values to determine a second vehicle operational parameter value; and determining the predicted operational capacity measurement value based at least in part on the vehicle operational parameter value and the second vehicle operational parameter value.

J: The one or more non-transitory computer-readable media of any of paragraphs F-I, wherein the operations further comprise: determining a plurality of probability distributions of historical vehicle operational parameter values based at least in part on the vehicle operational parameter data; and determining the rate of change of the vehicle operational parameter based at least in part on the plurality of the probability distributions of the historical vehicle operational parameter values.

K: The one or more non-transitory computer-readable media of paragraph J, wherein determining the first probability distribution comprises modifying a distribution of the probability distributions of the historical vehicle operational parameter values based at least in part on the rate of change.

L: The one or more non-transitory computer-readable media of any of paragraphs F-K, wherein the operations further comprise: determining a third probability distribution of second vehicle operational parameter values based at least in part on the first probability distribution of the vehicle operational parameter values and the rate of change; and determining a fourth probability distribution of second predicted operational capacity measurement values based at least in part on the third probability distribution of the second vehicle operational parameter values.

M: The one or more non-transitory computer-readable media of paragraph L, wherein: the vehicle operational parameter values are associated with a first time period; and the second vehicle operational parameter values are associated with a second time period that is later than the first time period.

N: The one or more non-transitory computer-readable media of any of paragraphs F-M, wherein operating the one or more vehicles associated is further based at least in part on determining that a target operational capacity measurement value represented in the second probability distribution of predicted operational capacity measurement values is not associated with a probability equal to or greater than a target probability.

O: A method comprising: receiving vehicle operational data associated with an autonomous vehicle operating in an environment; determining a first probability distribution of vehicle operational parameter values based at least in part on the vehicle operational data and a rate of change of a vehicle operational parameter associated with the vehicle operational parameter values; determining a second probability distribution of predicted operational capacity measurement values based at least in part on sampling the first probability distribution of the vehicle operational parameter values; and instructing one or more autonomous vehicles to operate from a first geographical location to a second geographical location based at least in part on the second probability distribution of the predicted operational capacity measurement values.

P: The method of paragraph O, wherein: the method further comprises: determining an outlier value represented in the second probability distribution and associated with a target predicted operational capacity measurement value; and determining a first vehicle operational parameter associated with the outlier value; and instructing the one or more autonomous vehicles to operate from the first geographical location to the second geographical location is further based at least in part on the first vehicle operational parameter.

Q: The method of paragraph P, wherein: the method further comprises determining a third probability distribution of predicted operational capacity measurement values based at least in part on the first vehicle operational parameter; and instructing the one or more autonomous vehicles to operate from the first geographical location to the second geographical location is further based at least in part on the third probability distribution.

R: The method of paragraph P, wherein the first vehicle operational parameter represents a quantity of available autonomous vehicles.

S: The method of any of paragraphs O-R, wherein determining the second probability distribution comprises: determining a threshold number of samples of the first probability distribution; and determining the threshold number of the predicted operational capacity measurement values based on the samples of the first probability distribution.

T: The method of any of paragraphs O-S, wherein the predicted operational capacity measurement values comprise one or more values representing one or more of: a total number of miles of manual operation of vehicles in a fleet comprising the autonomous vehicle for a time period; or an average number of miles of manual operation per vehicle in the fleet for the time period.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving vehicle operational data associated with a first plurality of autonomous vehicles operating in a first geographical region;
determining a plurality of distributions of vehicle operational parameter values based at least in part on the vehicle operational data;
determining a rate of change of a vehicle operational parameter based at least in part on the plurality of distributions of the vehicle operational parameter values;
determining a first distribution of predicted vehicle operational parameter values based at least in part on the plurality of distributions of the vehicle operational parameter values and the rate of change;
determining predicted operational capacity measurement values based at least in part on sampling the first distribution of the predicted vehicle operational parameter values;
determining a second distribution of the predicted operational capacity measurement values; and
based at least in part on the second distribution of the predicted operational capacity measurement values, autonomously controlling one or more vehicles associated with a vehicle supply to the first geographical region, wherein the vehicle supply is associated with the first plurality of autonomous vehicles and a second plurality of autonomous vehicles operating in a second geographical region distinct from the first geographical region.

2. The system of claim 1, wherein determining the predicted operational capacity measurement values is further based at least in part on sampling a third probability distribution of second predicted vehicle operational parameter values.

3. The system of claim 1, the operations further comprise:
determining, based at least in part on the second distribution of the predicted operational capacity measurement values, a parameter value of the predicted vehicle operational parameter values;
determining an adjusted parameter value based at least in part on the parameter value of the predicted vehicle operational parameter values; and
controlling the one or more vehicles is further based at least in part on the adjusted parameter value.

4. The system of claim 3, wherein the predicted operational capacity measurement values comprise one or more values representing one or more of:
a first total number of miles of operation of vehicles in the first plurality of autonomous vehicles for a time period;
a second total number of miles autonomous operation of the vehicles in the first plurality of autonomous vehicles for the time period;
a first average number of miles of operation per vehicle in the first plurality of autonomous vehicles for the time period; or
a second average number of miles of autonomous operation per vehicle in the first plurality of autonomous vehicles for the time period.

5. The system of claim 1, wherein controlling the one or more vehicles is further based at least in part on comparing one or more target operational capacity measurement values to the second distribution of the predicted operational capacity measurement values.

6. One or more non-transitory computer-readable media storing instructions that, when executed by one or more processors, cause the one or more processors to perform operations comprising:
determining vehicle operational parameter data based at least in part on data received from a plurality of autonomous vehicles in a subset of a fleet of vehicles;

determining a first probability distribution of vehicle operational parameter values based at least in part on the vehicle operational parameter data and a rate of change of a vehicle operational parameter associated with the vehicle operational parameter values;

determining a second probability distribution of predicted operational capacity measurement values based at least in part on the first probability distribution of the vehicle operational parameter values;

associating the predicted operational capacity measurement values with corresponding vehicle operational parameter values in a computer memory; and based at least in part on the second probability distribution of predicted operational capacity measurement values, autonomously operating one or more vehicles associated with a vehicle supply associated with the fleet of vehicles to a geographical region associated with the subset of the fleet of vehicles.

7. The one or more non-transitory computer-readable media of claim 6, wherein determining the second probability distribution of the predicted operational capacity measurement values comprises iteratively determining the predicted operational capacity measurement values by:

sampling the first probability distribution to determine a vehicle operational parameter value; and determining a predicted operational capacity measurement value based at least in part on the vehicle operational parameter value.

8. The one or more non-transitory computer-readable media of claim 7, wherein iteratively determining the predicted operational capacity measurement values comprises iteratively determining a threshold quantity of the predicted operational capacity measurement values.

9. The one or more non-transitory computer-readable media of claim 7, wherein iteratively determining the predicted operational capacity measurement values comprises:

sampling a third probability distribution of second vehicle operational parameter values to determine a second vehicle operational parameter value; and determining the predicted operational capacity measurement value based at least in part on the vehicle operational parameter value and the second vehicle operational parameter value.

10. The one or more non-transitory computer-readable media of claim 6, wherein the operations further comprise:

determining a plurality of probability distributions of historical vehicle operational parameter values based at least in part on the vehicle operational parameter data; and determining the rate of change of the vehicle operational parameter based at least in part on the plurality of the probability distributions of the historical vehicle operational parameter values.

11. The one or more non-transitory computer-readable media of claim 10, wherein determining the first probability distribution comprises modifying a distribution of the plurality of probability distributions of the historical vehicle operational parameter values based at least in part on the rate of change.

12. The one or more non-transitory computer-readable media of claim 6, wherein the operations further comprise:

determining a third probability distribution of second vehicle operational parameter values based at least in part on the first probability distribution of the vehicle operational parameter values and the rate of change; and determining a fourth probability distribution of second predicted operational capacity measurement values based at least in part on the third probability distribution of the second vehicle operational parameter values.

13. The one or more non-transitory computer-readable media of claim 12, wherein:

the vehicle operational parameter values are associated with a first time period; and the second vehicle operational parameter values are associated with a second time period that is later than the first time period.

14. The one or more non-transitory computer-readable media of claim 6, wherein operating the one or more vehicles associated is further based at least in part on determining that a target operational capacity measurement value represented in the second probability distribution of predicted operational capacity measurement values is not associated with a probability equal to or greater than a target probability.

15. A method comprising:

receiving vehicle operational data associated with an autonomous vehicle operating in an environment;

determining a first probability distribution of vehicle operational parameter values based at least in part on the vehicle operational data and a rate of change of a vehicle operational parameter associated with the vehicle operational parameter values;

determining a second probability distribution of predicted operational capacity measurement values based at least in part on sampling the first probability distribution of the vehicle operational parameter values; and instructing one or more autonomous vehicles to autonomously operate from a first geographical location to a second geographical location based at least in part on the second probability distribution of the predicted operational capacity measurement values.

16. The method of claim 15, further comprising:

determining an outlier value represented in the second probability distribution and associated with a target predicted operational capacity measurement value; and determining a first vehicle operational parameter associated with the outlier value; and instructing the one or more autonomous vehicles to autonomously operate from the first geographical location to the second geographical location is further based at least in part on the first vehicle operational parameter.

17. The method of claim 16, further comprising:

determining a third probability distribution of predicted operational capacity measurement values based at least in part on the first vehicle operational parameter; and instructing the one or more autonomous vehicles to autonomously operate from the first geographical location to the second geographical location is further based at least in part on the third probability distribution.

18. The method of claim 16, wherein the first vehicle operational parameter represents a quantity of available autonomous vehicles.

19. The method of claim 15, wherein determining the second probability distribution comprises:

determining a threshold number of samples of the first probability distribution; and determining a threshold number of the predicted operational capacity measurement values based on the samples of the first probability distribution.

20. The method of claim 15, wherein the predicted operational capacity measurement values comprise one or more values representing one or more of:
- a total number of miles of manual operation of vehicles in a fleet comprising the autonomous vehicle for a time period; or
- an average number of miles of manual operation per vehicle in the fleet for the time period.

\* \* \* \* \*